(12) United States Patent
Sakabe et al.

(10) Patent No.: US 8,184,937 B2
(45) Date of Patent: May 22, 2012

(54) OPTICAL CABLE

(75) Inventors: Itaru Sakabe, Yokohama (JP); Eisuke Sasaoka, Yokohama (JP); Tomoyuki Hattori, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 391 days.

(21) Appl. No.: 12/526,440

(22) PCT Filed: Jan. 29, 2008

(86) PCT No.: PCT/JP2008/051280
§ 371 (c)(1),
(2), (4) Date: Aug. 7, 2009

(87) PCT Pub. No.: WO2008/096637
PCT Pub. Date: Aug. 14, 2008

(65) Prior Publication Data
US 2010/0322572 A1 Dec. 23, 2010

(30) Foreign Application Priority Data

Feb. 8, 2007 (JP) .................. P2007-029360
Feb. 9, 2007 (JP) .................. P2007-030829

(51) Int. Cl.
*G02B 6/036* (2006.01)
*G02B 6/02* (2006.01)
(52) U.S. Cl. ......... 385/128; 385/123; 385/126; 385/127
(58) Field of Classification Search ........... 385/123–128
See application file for complete search history.

(56) References Cited

U.S. PATENT DOCUMENTS

| 6,298,188 B1 | 10/2001 | Chapin et al. |
| 6,345,140 B1 * | 2/2002 | Sasaoka et al. ............... 385/123 |
| 7,539,383 B2 * | 5/2009 | Sendai et al. ................. 385/128 |

(Continued)

FOREIGN PATENT DOCUMENTS

CN 2294479 Y 10/1998

(Continued)

OTHER PUBLICATIONS

International Preliminary Report on Patentability and Written Opinion of the International Searching Authority, issued in International Patent Application No. PCT/JP2008/051280, mailed Aug. 20, 2009.

(Continued)

*Primary Examiner* — Rhonda Peace
(74) *Attorney, Agent, or Firm* — McDermott Will & Emery LLP

(57) ABSTRACT

The present invention relates to an optical cable with a structure for improving a durability performance. The optical cable comprises, as a basic structure: a coated optical fiber, and a cable jacket covering an outer periphery of the coated optical fiber. The coated optical fiber is constituted by a glass fiber and a coating layer of an ultraviolet curing resin. To realize excellent impact resistance as durability performance, the coating layer of the coated optical fiber includes a first coating with a Young's modulus of 200 MPa or more. Meanwhile, the cable jacket is comprised of a thermoplastic resin that does not contain any halogens. The cable jacket has a thickness of 0.7 mm or more, a flame retardancy of V2 or more according to UL Standards, and a Young's modulus equal to or greater than that of the first coating.

6 Claims, 14 Drawing Sheets

U.S. PATENT DOCUMENTS

| | | | |
|---|---|---|---|
| 2001/0017967 A1* | 8/2001 | Hirano et al. | 385/123 |
| 2002/0097972 A1* | 7/2002 | Sasaoka et al. | 385/124 |
| 2002/0154875 A1* | 10/2002 | Sasaoka et al. | 385/123 |
| 2003/0012536 A1* | 1/2003 | Simomichi et al. | 385/128 |
| 2003/0044136 A1 | 3/2003 | Nakamura et al. | |
| 2003/0059613 A1 | 3/2003 | Tirelli et al. | |
| 2003/0133679 A1 | 7/2003 | Murphy et al. | |

FOREIGN PATENT DOCUMENTS

| | | |
|---|---|---|
| JP | 7-005328 | 1/1995 |
| JP | 8-327861 | 12/1996 |
| JP | 2003-227975 | 8/2003 |
| JP | 2004-004637 | 1/2004 |
| JP | 2004-144821 | 5/2004 |
| JP | 2004-198588 | 7/2004 |
| JP | 2005-008448 | 1/2005 |
| JP | 2005-062287 | 3/2005 |
| JP | 2005-091616 | 4/2005 |
| JP | 2005-107441 | 4/2005 |
| JP | 2005-121754 | 5/2005 |
| JP | 2005-221919 | 8/2005 |
| JP | 2005-326781 | 11/2005 |

OTHER PUBLICATIONS

Chinese Office Action, w/ English translation thereof, issued in Chinese Patent Application No. CN 200880004360.1 dated Aug. 6, 2010.
Extended European Search Report issued in European Patent Application No. EP 08710607.6 dated Oct. 11, 2011.

* cited by examiner

Fig.1
(a)
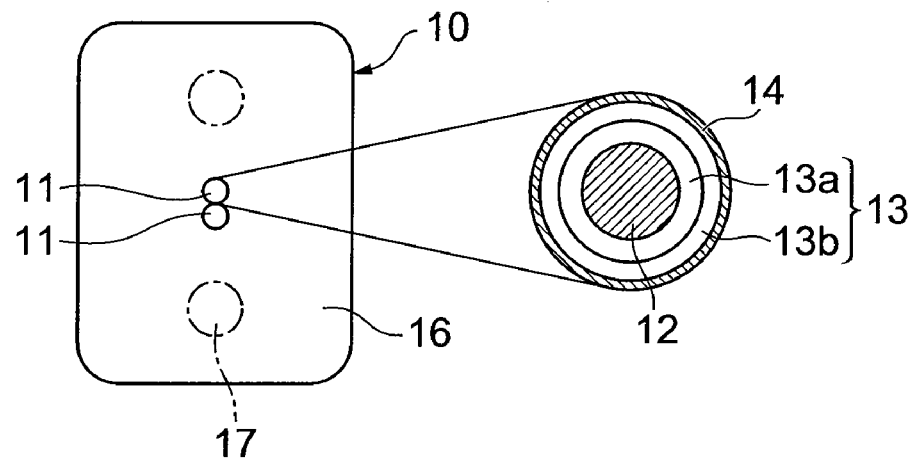
(b)
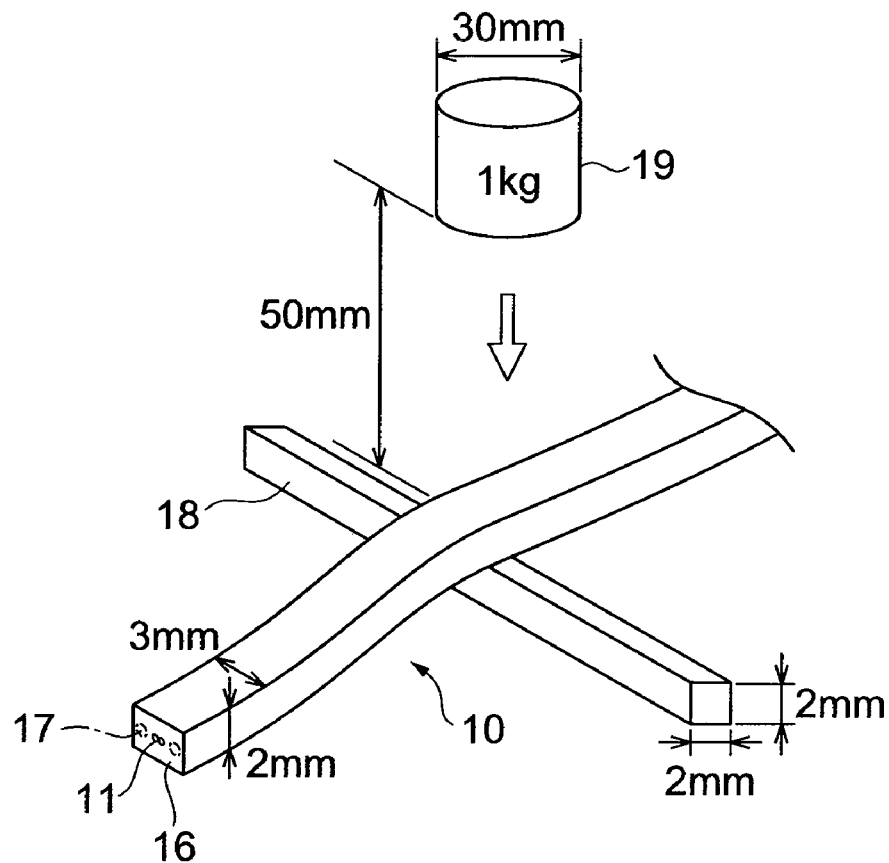

Fig.7

| | IMPACT CHARACTERISTICS | | TEMPERATURE CHARACTERISTICS | COMPREHENSIVE JUDGMENT RESULT |
|---|---|---|---|---|
| | COLLAPSE PERCENTAGE OF CABLE JACKET (JUDGMENT) | PRESENCE/ NON-PRESENCE OF COATED OPTICAL FIBER DAMAGE (JUDGMENT) | TRANSMISSION LOSS INCREASE AMOUNT $\Delta\alpha$ (JUDGMENT) | |
| SAMPLE 1-1 | 15%(GOOD) | NONE(GOOD) | 0.3dB/20m(GOOD) | GOOD |
| SAMPLE 1-2 | 16%(GOOD) | NONE(GOOD) | <0.02dB/20m(GOOD) | GOOD |
| SAMPLE 1-3 | 17%(GOOD) | NONE(GOOD) | <0.02dB/20m(GOOD) | GOOD |
| SAMPLE 1-4 | 16%(GOOD) | NONE(GOOD) | 0.28dB/20m(GOOD) | GOOD |
| SAMPLE 1-5 | 18%(GOOD) | NONE(GOOD) | <0.02dB/20m(GOOD) | GOOD |
| COMPARATIVE EXAMPLE 1-1 | 50%(POOR) | PRESENT(POOR) | <0.02dB/20m(GOOD) | POOR |
| COMPARATIVE EXAMPLE 1-2 | 15%(GOOD) | PRESENT(POOR) | <0.02dB/20m(GOOD) | POOR |

Fig.8
(a)
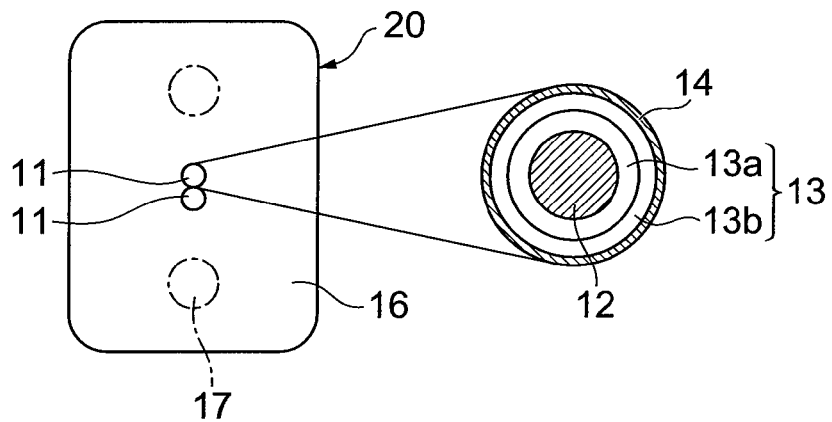
(b)
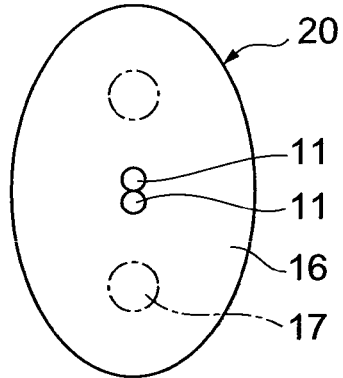
(c)
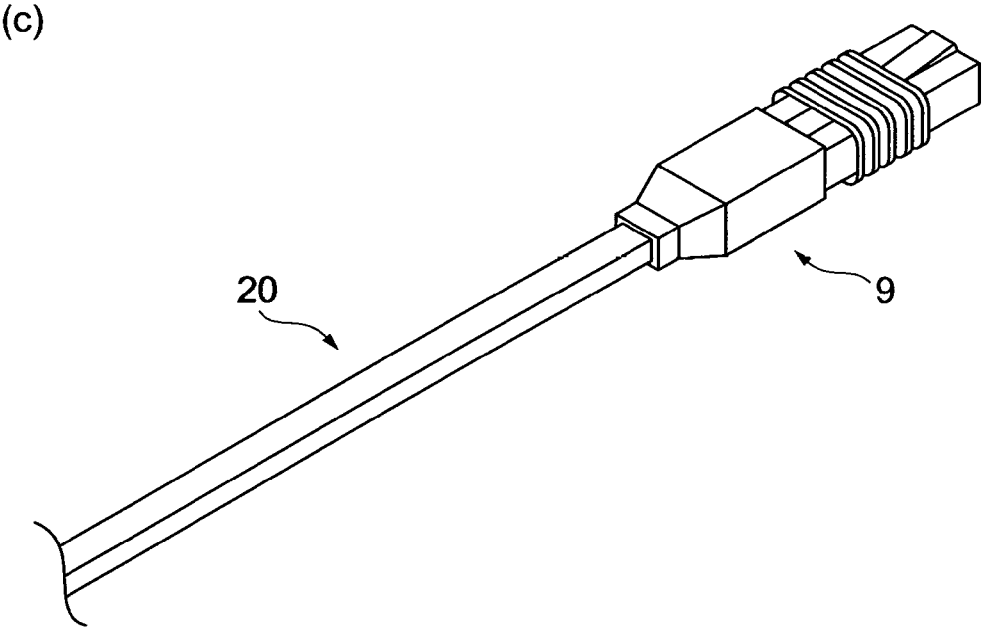

Fig.13

| | TENSION MEMBER | CABLE TENSION BEFORE BENDING TEST(N) | CABLE TENSION AFTER BENDING TEST(N) | JUDGMENT WITH RESPECT ALLOWABLE TENSION OF 70N |
|---|---|---|---|---|
| SAMPLE 2-1 | MAINLY CABLE JACKET | 89N | 87N | GOOD |
| SAMPLE 2-2 | MAINLY HIGH-STRENGTH POLYMER FIBERS(PBO) | 94N | 93N | GOOD |
| SAMPLE 2-3 | MAINLY HIGH-STRENGTH POLYMER FIBERS(PBO-FRP) | 94N | 90N | GOOD |
| COMPARATIVE EXAMPLE 2-1 | MAINLY WIRES (TWO WIRES OF 0.4mm DIAMETER EACH) | 160N | ― (BECAME BROKEN AT APPROXIMATELY 2,000 TIMES) | POOR |
| COMPARATIVE EXAMPLE 2-2 | MAINLY STRANDED WIRES (TWO STRANDED WIRES, EACH FORMED BY STRANDING 9 WIRES OF 0.17mm DIAMETER EACH) | 260N | ― (BECAME BROKEN AT APPROXIMATELY 10,000 TIMES) | POOR |

US 8,184,937 B2

OPTICAL CABLE

RELATED APPLICATIONS

This application is the U.S. National Phase under 35 U.S.C. §371 of International Application No. PCT/JP2008/051280, filed on Jan. 29, 2008, which in turn claims the benefit of Japanese Application Nos. 2007-029360, filed on Feb. 8, 2007 and 2007-030829, filed on Feb. 9, 2007, the disclosures of which Applications are incorporated by reference herein.

TECHNICAL FIELD

The present invention relates to an optical cable applicable to optical LAN wiring, etc., for connecting information equipments.

BACKGROUND ART

In the recent progress of optical communication technology, LAN (local area network) wiring, inter-equipment wiring, etc., for optical communication have come to be employed. To an optical cable used in optical LAN wiring, inter-equipment optical wiring, etc., for indoor or in-vehicle use, high flexibility and thin diameter are desired in consideration of use in special environments with congested portions and uneven portions.

An optical cable used in such a special environment is comparatively short in length (1 m to 20 m) in comparison to a normal optical cable (optical cable for long-haul communication). Such a short-length optical cable is thus not required to be as low in transmission loss as an ordinary optical cable. In contrast, when an optical cable is used in a special environment, a flame retardant is contained at a weight percentage of 30% or more in a cable jacket in many cases. This is because when an optical cable is small in external dimensions, it contacts air readily due to being large in surface area per unit volume and because a halogen-free flame retardant of low flame retardancy needs to be used in consideration of environmental problems.

Also, optical LAN wiring, inter-equipment wiring, etc., are used, not for long-haul optical communication but for short-haul optical communication between equipments installed in a special environment, such as indoors, inside a vehicle, etc. Thus in an optical cable premised on use in a special environment, a multimode optical fiber of large core diameter, which is advantageous in optical linking property as compared with single mode optical fibers, is applied in many cases. However, as compared with such a general-purpose single mode optical fiber, a multimode optical fiber is susceptible to disturbance factors, such as thermal expansion and contraction, etc., and increases in transmission loss readily. A soft, ultraviolet curing acrylate resin (soft layer) with a Young's modulus of approximately 1 MPa is thus used as a coating layer for a coated optical fiber so that the disturbance factors can be relaxed.

As optical cables with a comparatively low number of coated optical fibers and small external cable dimensions, there are optical cables of shapes known as drop cables and indoor cables (see, for example, Patent Document 1). Normally, in this type of optical cable, tension members are disposed at opposite sides of one to several coated optical fibers, and the coated optical fibers and the tension members are integrally covered by a cable jacket formed of a thermoplastic resin. Also, in Patent Document 1, by positioning a fibrous interposed member at a periphery of the coated optical fibers, the optical cable is provided with impact resistance and lateral pressure resistance characteristics.

Furthermore, in an optical cable used in a special environment, such as indoors, in a vehicle, etc., a high bending performance is required for use as wiring in a congested location or wiring in an opening/closing portion of a door. Also, connection to equipment is generally achieved using an optical connector, and because there are cases where optical connectors are attached onsite and to reduce manufacturing costs even in cases where manufacturers attach optical connectors to optical cables, optical cables that are excellent in optical connector attachment property are being demanded.

As a conventional drop optical cable or indoor optical cable, there is known a cable structure, such as shown in the area (a) of FIG. 14, where tension members 3, each constituted by a steel wire of approximately 0.4 mm diameter are disposed at opposite sides of coated optical fibers 2, and the coated optical fibers 2 and the tension members 3 are integrally covered with a cable jacket 4 in a manner such that a cable outer diameter becomes approximately 2 to 4 mm (see, for example, Patent Document 2). As the tension member 3, there is also known a stranded steel wire, formed by stranding a plurality of thin steel wires, as shown in the area (b) of FIG. 14. Furthermore, as a structure of the tension member 3, there is known a structure, with which, in place of steel wires, glass fibers or aramid fibers, etc., are made integral by binding with resin.

Patent Document 1: Japanese Patent Application Laid-Open No. 2004-144821
Patent Document 2: Japanese Patent Application Laid-Open No. 2004-198588

DISCLOSURE OF THE INVENTION

Problems that the Invention is to Solve

The present inventors have examined conventional optical cables, and as a result, have discovered the following problems. That is, in an optical cable applied in LAN or inter-equipment wiring, etc., a situation may occur where a small working tool, such as a nipper, is dropped onto the optical cable at a location where a projection is positioned below the optical cable. Durability performance for withstanding such impacts is thus required of an optical cable assumed for use in a special environment. However, when an optical cable is small in external dimensions, impact resistance is lowered because a cable jacket for protecting the optical cable is made thin in thickness. Also, as a non-halogen-based flame retardant, which is added to the cable jacket to improve flame retardancy, increases in added amount, the cable jacket undergoes plastic deformation more readily. When an impact is applied in this case, an indentation due to collapse remains on the cable jacket as in clay, and the coated optical fiber covered by the cable jacket also becomes damaged readily. In the present Specification, "damage of the coated optical fiber" refers to separation of an interface of a glass portion and a resin coating, cracking of the resin coating, etc.

When as a coating layer of the coated optical fiber, a resin of low Young's modulus (an acrylate resin, etc., of low Young's modulus) is applied, although the optical fiber becomes in improved transmission characteristics, the coating layer itself collapses when an impact is applied from the exterior. In accompaniment, a large distortion occurs in a colored layer of the coated optical fiber that is positioned on a surface of the coating layer. Because of being low in transmission of ultraviolet rays due to addition of a colorant, the colored layer has a large amount of crosslinked components of low rupture elongation added therein to promote curing. Because the rupture elongation consequently becomes approximately 2% and extremely low, the rupture elongation limit is exceeded and damage of the colored layer itself occurs.

Furthermore, in an optical cable with a low number of coated optical fibers and small external dimensions such as described above, collapse of the cable jacket occurs readily upon application of impact and the coating layer of the coated optical fibers also becomes damaged readily. When collapse of the cable jacket occurs, the collapsed portion tends to become a starting point of bending and the optical cable itself may become bent at a diameter no more than an allowable bending diameter. In regard to damage of the coated optical fiber, rupture of the fiber glass may occur under an environment where temperature changes, vibration, etc., are applied over a long term and there is thus an uncertainty in regard to long-term reliability.

Here, the impact resistance can be improved by covering the periphery of the optical fiber with a fibrous interposed member as disclosed in Patent Document 1. However, an optical cable applied to LAN or inter-equipment wiring, etc., is normally used upon attachment of an optical connector in many cases, and when a fibrous interposed member is present, connector attachment workability becomes poor, etc., The impact resistance of the optical cable can also be improved by increasing the thickness of the cable jacket. However in this case, the external dimensions of the optical cable are made large. Wiring space is thus increased, a cable bending rigidity becomes high, and handling properties of the optical cable itself thus become poor.

In addition, when an optical cable is used in a door or other opening/closing portion, the optical cable is required to exhibit a high bending performance. For example, a durability performance, such that the optical cable does not become damaged even when bent 100,000 times or more to 90° to the left and right at a bending radius R of 9 mm, is required. In the case where single-core steel wires are applied as tension members as shown in the area (a) of FIG. 14, metal fatigue (breakage of the tension members) occurs at approximately 2,000 times of bending to 90° to the left and right at a bending radius R of 9 mm. Also, even when stranded steel wires are applied as the tension members as shown in the area (b) of FIG. 14, the tension members become broken at approximately 10,000 times of bending. It is thus difficult to secure the abovementioned bending performance when a metal wire is included inside the optical cable.

Use of a nonmetallic material, with which a high-strength glass fiber material or aramid fiber material is bound integrally with resin, as a tension member for an optical cable is also known. However, such a nonmetallic material tension member may become ruptured when bent to a bending radius R of approximately 9 mm, and although complete breakage as in the case of a metal wire may not occur, lowering of tensile strength occurs. When, as a tension member, a high-strength fiber material is used without binding with a resin, processing of the fiber material in attaching an optical connector to an optical cable terminal takes time and workability is lowered.

The present invention has been developed to eliminate the problems described above. It is an object of the present invention to provide an optical cable having a structure for improving durability in comparison to conventional optical cables. In the present Specification, durability performance of an optical cable refers to resistance (quality maintenance performance) against heat, vibration, impact and other environmental changes and shape changes (bending, expansion/ contraction, etc.,) and is expressed, for example, by impact resistance, bending performance, etc.

Means for Solving the Problems

An optical cable according to the present invention comprises, as a basic structure, a coated optical fiber, and a cable jacket covering an outer periphery of the coated optical fiber. The coated optical fiber comprises a bared fiber mainly comprised of silica glass, and a coating layer provided on an outer periphery of the bared fiber and comprised of an ultraviolet curing resin.

In the optical cable according to the present invention, to realize excellent impact resistance as durability performance, the coating layer of the coated optical fiber includes a first coating (hard layer) with a Young's modulus of 200 MPa or more. Meanwhile, the cable jacket is comprised of a thermoplastic resin that does not contain any halogens. The cable jacket has a thickness of 0.7 mm or more, a flame retardancy of V2 or more according to UL Standards, and a Young's modulus equal to or greater than that of the first coating. The cable jacket covers the coated optical fiber such that the optical cable is rectangular, elliptical, or circular in cross-sectional shape.

In the optical cable according to the present invention having the above-described structure, the coating layer may have any of various structures. For example, the coating layer with a Young's modulus of 700 MPa or more may have a single layer structure with which the first coating directly contacts a surface of the bared fiber. The coating layer may instead have a multilayer structure including, in addition to the first coating, a second coating (soft layer) provided between the bared fiber and the first coating. In the case of such a multilayer structure, the second coating preferably has a Young's modulus of 0.5 to 2 MPa.

The optical cable according to the present invention may furthermore have a colored layer provided on the outer periphery of the coated optical fiber. The cable jacket covers the coated optical fiber integrally along with the colored layer. In this case, the colored layer preferably has a rupture elongation of 10% or more. In the structure where no colored layer is provided, the cable jacket covers the coated optical fiber in a state of directly contacting the coated optical fiber.

The optical cable according to the present invention may furthermore have a protective layer provided on an outer periphery of the colored layer. In this case, the protective layer is preferably comprised of an ultraviolet curing resin with a Young's modulus of 50 to 300 MPa.

On the other hand, in the optical cable according to the present invention, it is preferable that the cable jacket does not contain any metal wires in its interior, in order to realize excellent bending performance as durability performance. Also, the cable jacket preferably exhibits a pulling tension of 50 N or more when elongated by 1% along a longitudinal direction of the optical cable. The optical cable according to the present invention may furthermore have a connection part attached to the cable jacket so as to be positioned at an end of the optical cable. In this case, the cable jacket is preferably made integral with the coated optical fiber such that the optical cable exhibits an overall pulling tension of 50 N or more when the optical cable is elongated by 1% along its longitudinal direction. Here, the "overall pulling tension" refers to the pulling tension when the optical cable is elongated by 1% along its longitudinal direction with the cable jacket being held and pulling tensions of other members, such as the coated optical fiber made integral with the cable jacket, etc., are incorporated therein. The cable jacket covers the coated optical fiber such that a cross-sectional shape of the optical cable is rectangular, elliptical, or circular. Preferably, the cable jacket has a maximum outer diameter of 4 mm or less.

In order to realize excellent bending performance, the optical cable according to the present invention may be modified in various ways. For example, the optical cable does not have to contain an antishrinking material. In this case, preferably, a resin with a Young's modulus of 0.1 MPa to 10 MPa is coated onto the surface of the bared fiber of the coated optical fiber.

Also, the optical cable does not have to contain a tension member. In this case, the cable jacket is preferably comprised of a thermoplastic resin with a Young's modulus of 200 to 1500 MPa.

Furthermore, in the optical cable according to the present invention, a high-strength fiber bundles may be covered, integrally along with the coated optical fiber, by the cable jacket in a state of being disposed along the coated optical fiber at opposite sides of the coated optical fiber. In this case, each high-strength fiber bundle covered by the cable jacket is preferably covered by the cable jacket at a density such that a force of extracting the high-strength fiber bundle from the cable jacket is 50 N/cm to 900 N/cm.

Rod-like wires, formed by binding high-strength fiber bundles with a matrix resin, may be disposed at opposite sides of the coated optical fiber. The coated optical fiber and the rod-like wires are covered integrally by the cable jacket. A thickness of each rod-like wire in a direction orthogonal to a direction of arrangement with respect to the coated optical fiber is preferably a thickness that withstands a predetermined bending test.

The bending test is performed by measuring the overall pulling tension of the cable jacket after bending 100,000 times to 90° to the left and right at a curvature radius of 9 mm. As good bending performance, the pulling tension when the cable jacket is elongated by 1% in its longitudinal direction is required to be 50 N or more.

Furthermore, the high-strength fiber bundles to be disposed inside the cable jacket as the tension members may have a conductive property.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

Effects of the Invention

In accordance with the present invention, by securing elasticity of the cable jacket, excellent impact characteristics are provided as durability performance. That is, collapse of the cable jacket can be suppressed to no more than a predetermined value and a tendency for a portion that has received impact to bend readily can be alleviated. Also, by making the coating layer of the coated optical fiber be comprised of a resin material with the above-described characteristics, damage of the colored layer of low rupture elongation can be alleviated, rupture of the bared fiber (glass fiber), included in the coated optical fiber, can be suppressed, and long-term reliability can be improved.

Also, in accordance with the present invention, an optical cable suitable for LAN wiring is provided that exhibits a pulling tension for adequately withstanding a tension temporarily applied during installation of the optical cable, does not undergo rupture in a test of bending 100,000 times to 90° to the left and right at a curvature radius R of 9 mm, and exhibits excellent workability in attachment of an optical connector.

BRIEF DESCRIPTION OF THE DRAWINGS

FIG. 1 shows diagrams for explaining a basic structure (cross-sectional structure) of a first embodiment of an optical cable according to the present invention and a method of testing impact resistance;

FIG. 7 is a table of results of judging impact and temperature characteristics as durability performance of the first to fifth samples (Sample 1-1 to Sample 1-5), a first comparative example (Comparative Example 1-1), and a second comparative example (Comparative Example 1-2) of the optical cable according to the first embodiment;

FIG. 8 shows diagrams of basic structures (cross-sectional structures) and an outer appearance of a second embodiment of an optical cable according to the present invention;

FIG. 13 is a table of results of judging bending performance as durability performance of the first to third samples (Sample 2-1 to Sample 2-3), a first comparative example (Comparative Example 2-1), and a second comparative example (Comparative Example 2-2) of the optical cable according to the second embodiment.

DESCRIPTION OF THE REFERENCE NUMERALS

Figure 2:
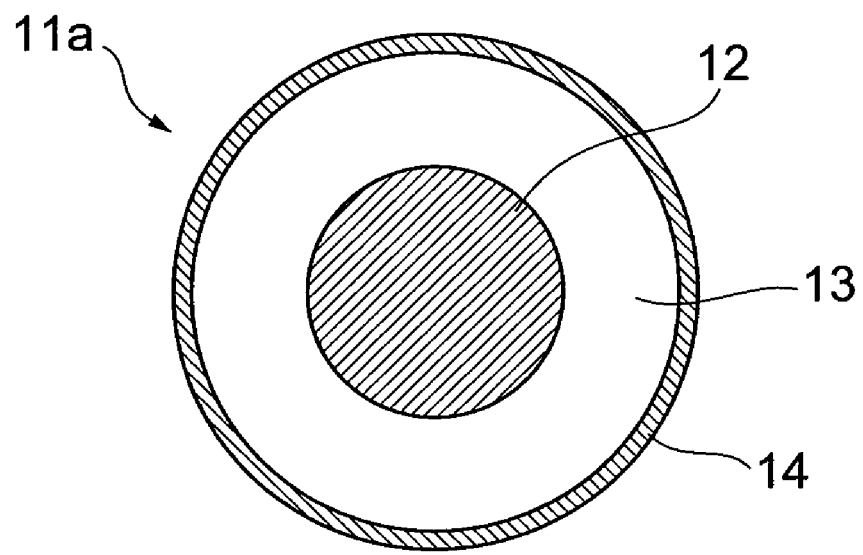
FIG. 2 is a diagram for explaining a cross-sectional structure of a coated optical fiber applied to a first sample (Sample 1-1) of the optical cable according to the first embodiment.

10, 20, 20*a*, 20*b*, 20*c* . . . optical cable; 11, 11*a*, 11*b*, 11*c*, 11*d*, 11*e* . . . coated optical fiber; 12 . . . glass fiber (bared fiber); 13 . . . coating layer; 13*a* . . . primary coating (soft layer); 13b... secondary coating (hard layer); 14... colored layer; 15... protective layer; 16... cable jacket; 17, 17a, 17b, 17c... tension member; 18... metal rod; and 19... weight.

BEST MODES FOR CARRYING OUT THE INVENTION

In the following, embodiments of an optical cable according to the present invention will be explained in detail with reference to FIGS. 1 to 14. In the description of the drawings, identical or corresponding components are designated by the same reference numerals, and overlapping description is omitted.

(First Embodiment)

A first embodiment of an optical cable according to the present invention will first be explained in detail with reference to FIGS. 1 to 7. FIG. 1 shows diagrams for explaining the first embodiment of the optical cable according to the present invention, whereas the area (a) of FIG. 1 showing a basic structure (cross-sectional structure) of the optical cable, and the area (b) of FIG. 1 being a diagram describing a method for testing impact resistance of the optical cable. In the area (a) of FIG. 1, the optical cable 10 comprises coated optical fibers 11, tension members 17 disposed along the coated optical fibers 11 at opposite sides of the coated optical fibers 11, and a cable jacket 16 integrally covering the coated optical fibers 11 and the tension members 17. Each coated optical fiber 11 comprises a bared fiber (glass fiber) 12, a coating layer 13 provided on an outer periphery of the glass fiber 12, and a colored layer 14 provided on a surface of the coating layer 13. The glass fiber 12 comprises a core extending along a predetermined axis and having a predetermined refractive index, and a cladding provided on an outer periphery of the core and having a refractive index lower than that of the core. The coating layer 13 may have a multilayer structure constituted by a primary coating (soft layer) 13a and a secondary coating (hard layer) 13b, or may have a single layer structure constituted by just a hard layer. As shown in the area (b) of FIG. 1, an impact test of the optical cable 10 is performed by dropping a weight 19 onto a portion of the optical cable 10 placed on a metal member 18.

The optical cable 10 according to the first embodiment is an optical cable for optically connecting between a plurality of information equipments installed indoors or inside a vehicle and is comparatively short in length (for example, approximately 1 m to 20 m). In particular, the optical cable 10 is suitable, for example, for constructing a LAN using optical communication, etc., (LAN optical cable). As shown, for example, in the area (a) of FIG. 1, this type of optical cable 10 is obtained by arranging two or more coated optical fibers 11 in a column, positioning the tension members 17 at opposite sides of the optical fibers (the tension members 17 do not have to be positioned), and integrally covering the coated optical fibers 11 and the tension members 17 with the cable jacket 16.

As the glass fiber 12 of each coated optical fiber 11, a multimode glass fiber 12, which is comprised of silica glass and has a core diameter cladding diameter and a cladding diameter of 125 µm, can be applied. The silica-based optical fiber, mainly comprised of silica glass may be one whose core and cladding are comprised of silica glass, or one whose core only is comprised of silica glass and whose cladding is comprised of hard plastic.

Each coated glass fiber 11 comprises the glass fiber 12, the coating layers 13a and 13b (comprised of an ultraviolet curing acrylate resin and having an outer diameter of approximately 245 µm) coated on the surface of the glass fiber 12, and the colored layer 14 provided on the surface of the coating layer 13b. The coating layer preferably has the two-layer structure of the primary coating 13a (soft layer) and the secondary coating 13b (hard layer). In this case, by making a Young's modulus of the primary coating 13a lower than a Young's modulus of the secondary coating 13b, the coated optical fiber 11 can be provided with a cushioning function against lateral pressure. Thus, in the coated optical fiber 11 having the coating layer 13 of such a multilayer structure, occurrence of microbending can be suppressed effectively and good light transmitting characteristics can be maintained.

In the optical cable 10 according to the first embodiment, the two or more coated optical fibers 11 are arranged next to each other, the tension members 17 are disposed at opposite sides of the coated optical fibers 11, and the optical cable 10 is obtained by covering the coated optical fibers 11 and the tension members 17 integrally with the cable jacket 16. The tension members 17 do not have to be positioned. That is, as long as a pulling tension of no less than a predetermined value can be secured for the optical cable as a whole, the tension members 17 are not required in particular in a form of use, such as LAN wiring, where a large tension is not applied constantly. However, by the tension members 17 being positioned inside the cable jacket 16, tensions applied to the coated optical fibers 11 during installation work, etc., can be alleviated effectively. Here, a metal wire or a high-strength polymer fiber bundle, for example, of aramid fibers, etc., can be applied as the tension member 17. Furthermore, a high-strength polymer fiber bundle may be used in a form of a rod-like wire bound by a matrix resin.

The cable jacket 16 is comprised of a thermoplastic resin, such as a nylon resin, polyethylene, etc., and as shown in the area (a) of FIG. 1, covers the coated optical fibers 11 such that in cross section, the optical cable 10 takes on a rectangular or elliptical shape with a longer dimension side being in a direction of arrangement of the coated optical fibers 11. A coating thickness (minimum thickness of the cable jacket 16) of the cable jacket 16 along a shorter dimension side (in a direction orthogonal to the direction of arrangement of the coated optical fibers 11) is 0.7 mm or more. In the cross section of the cable jacket 16, an outer diameter along the longer dimension side (maximum outer diameter of the cable jacket 16) is preferably 4 mm or less. As the thermoplastic resin of the cable jacket 16, a non-halogen-containing resin with a flame retardancy of V2 according to UL Standards is employed. Besides this, various resins, such as styrene-based, olefin-based, polyester-based, and urethane-based resins, etc., may be employed in the cable jacket 16. The cable jacket 16 is formed by solid extrusion.

Solid extrusion is a method of extruding while applying pressure to the coated optical fibers 11, etc., so as to compress an extruded resin at an inner side of a die of a resin extruder. The extruded resin is in a compressed state inside the die, and the thermoplastic resin that is extruded onto outer peripheries of the coated optical fibers 11 can be put in highly close contact with the coated optical fibers 11 as the cable jacket 16. By the cable jacket 16 being in close contact with the coated optical fibers 11, meandering of the coated optical fibers 11 inside the cable can be prevented when the cable jacket 16 shrinks.

In the optical cable according to the present invention, the cable jacket 16 is comprised of an elastic thermoplastic resin with a Young's modulus of 200 MPa or more, in order to provide impact resistance as durability performance. Furthermore, the cable jacket 16 is preferably comprised of a resin material such that a collapse percentage determined by a predetermined test method is 25% or less.

The area (b) of FIG. 1 is a diagram for explaining a method for testing the impact resistance of the optical cable 10, and this test is performed on the optical cable 10 shown in the area (a) of FIG. 1. The optical cable 10 comprises the coated optical fibers 11, the tension members 17, and the cable jacket 16 that covers these components. Each coated optical fiber 11 is constituted by the multimode glass fiber 12 which is constituted by the core and the cladding, the coating layer 13 provided on the outer periphery of the glass fiber 12, and the colored layer 14 provided on the surface of the coating layer 13. Furthermore, the coating layer 13 has the two-layer structure constituted by the primary coating 13a (soft layer) in close contact with the glass fiber 12, and the secondary coating 13b (hard layer) provided on the outer periphery of the primary coating 13a. The cable jacket 16 covers the coated optical fibers 11 and the tension members 17, extends along the longitudinal direction of the coated optical fibers 11, has a rectangular cross section of 2 mm×3 mm, and is comprised of the thermoplastic resin. The longer dimension side (surface of 3 mm width) of the optical cable 10 is set horizontally, and the metal rod 18 of 2 mm square is placed below a lower surface of the optical cable 10. The weight 19 having a diameter of 30 mm and a mass of 1 kg is dropped onto the optical cable 10 from a height of 50 mm above the optical cable 10. The cable jacket 16 of the optical cable 10 according to the first embodiment is formed of the thermoplastic resin such that the collapse percentage of the cable jacket 16 resulting from the dropping of the weight 19 is 25% or less.

In accordance with the optical cable having the above arrangement, even when an impact due to an external force is applied to the optical cable in an installed state, deformation due to collapse of the cable jacket is restricted to the minimum and a tendency for the portion receiving the impact to become readily bendable can be alleviated. Damage of the coating layers and the colored layers of the coated optical fibers, such as separation at an interface between the glass fiber 12 and the coating layer 13, cracking of the coating layer 13 or the colored layer 14, etc., can also be alleviated.

(Sample 1-1)

FIG. 2 is a diagram for explaining a cross-sectional structure of a coated optical fiber 11a applied to a first sample (Sample 1-1) of the optical cable 10 according to the first embodiment. The cross section shown in FIG. 2 corresponds to the cross section of the coated optical fiber 11 applied to the optical cable 10 shown in the area (a) of FIG. 1.

The optical cable of Sample 1-1 is obtained by arranging two of the coated optical fibers 11a (FIG. 2) in a column as shown in the area (a) of FIG. 1, positioning the tension members 17 at opposite sides of the coated optical fibers 11a, and integrally covering the coated optical fibers 11a and the tension members 17 with the cable jacket 16 having the rectangular cross-sectional shape of 2 mm×3 mm. The cable jacket 16 has a coating thickness of 0.9 mm in the direction orthogonal to the direction of arrangement of the coated optical fibers 11a. The cable jacket 16 is comprised of a nylon resin, which is a polyamide-based resin that does not contain any halogens and has a Young's modulus of 1200 MPa, a rupture elongation of 100%, and a flame retardancy of V2 according to UL Standards. As each tension member 17, a fiber material, with which high-strength polymer fibers are made integral by a polyester resin, is applied.

As the glass fiber 12 of each coated optical fiber 11a, a multimode glass fiber with a core diameter of 50 μm and a cladding diameter of 125 μm is applied. In the optical cable of Sample 1-1, the coating layer 13 is formed to an outer diameter of 170 μm on the outer periphery of the glass fiber 12 to make appropriate the Young's modulus of the coating layer 13. The coating layer 13 has a single layer structure of just a hard layer and is comprised of an ultraviolet curing acrylate resin with a Young's modulus of 800 MPa and a rupture elongation of 56%. The colored layer 14 is furthermore formed to an outer diameter of 180 μm on the surface of the coating layer 13. The colored layer 14 is comprised of an ultraviolet curing acrylate resin with a Young's modulus of 1200 MPa and a rupture elongation of 2%.

As a result of conducting the impact resistance test according to the method shown in the area (b) of FIG. 1 on the optical cable of Sample 1-1 with the above-described arrangement, the collapse percentage of the cable jacket 16 of Sample 1-1 was found to be 15%. There was no damage of the coating layers 13 and the colored layers 14 of the coated optical fibers 11a, and, as a result of a temperature test of (−40° to 125° C.)×3 cycles, a transmission loss increase amount Δα of Sample 1-1 was 0.30 dB/20 m.

The thermoplastic resin with the Young's modulus of 1200 MPa was applied as the cable jacket 16 in the optical cable of Sample 1-1, and by application of the resin with the Young's modulus of 200 MPa or more, the collapse percentage of the cable jacket as determined by the test method shown in the area (b) of FIG. 1 could be suppressed to 25% or less. Also, with respect to a standard of becoming fire extinguished in 70 seconds or less in an optical cable flame retardancy test (45° inclination test of ISO6722), the optical cable of Sample 1-1 was fire extinguished in 30 seconds.

In regard to coating damage of the coated optical fiber 11a, significant damage can be prevented as long as the Young's modulus of the ultraviolet-curing resin coating layer 13 on the glass fiber 12 is 200 MPa or more. However, when the cable jacket becomes too high in Young's modulus, it becomes high in bending rigidity and the cable becomes poor in flexibility. Also, when the Young's modulus becomes high, the rupture elongation decreases, and from the standpoint of preventing ease of cracking, the Young's modulus is preferably 1500 MPa or less. Furthermore, because when the cable jacket 16 becomes high in Young's modulus, it becomes low in rupture elongation, the Young's modulus is preferably 1200 MPa or less from the standpoint of long-term reliability.

(Sample 1-2)

Figure 3:
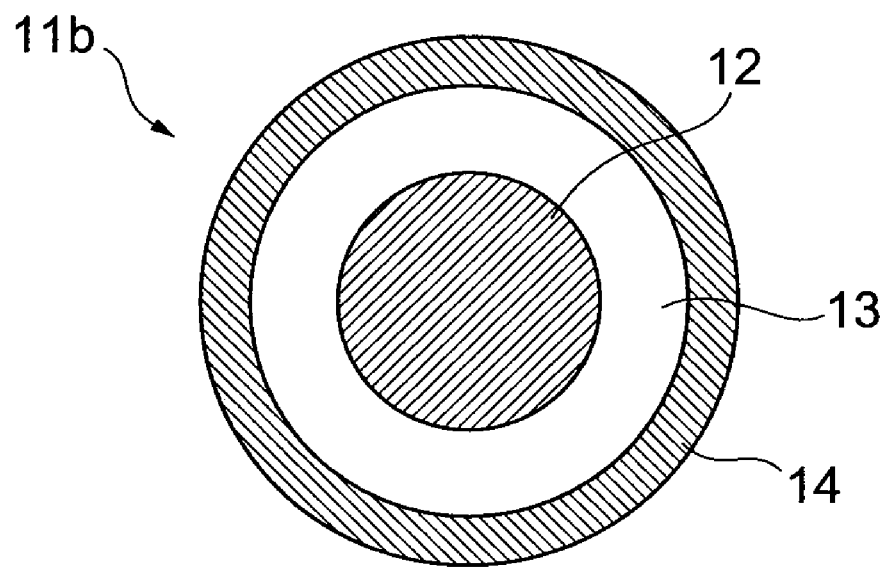
FIG. 3 is a diagram for explaining a cross-sectional structure of a coated optical fiber applied to a second sample (Sample 1-2) of the optical cable according to the first embodiment.

FIG. 3 is a diagram for explaining a cross-sectional structure of a coated optical fiber 11b, applied to a second sample (Sample 1-2) of the optical cable 10 according to the first embodiment. The cross section shown in FIG. 3 corresponds to the cross section of the coated optical fiber 11 applied to the optical cable 10 shown in the area (a) of FIG. 1.

The optical cable of Sample 1-2 is obtained by arranging two of the coated optical fibers 11b (FIG. 3) in a column in the same manner as in Sample 1-1 and as shown in the area (a) of FIG. 1, positioning the tension members 17 at opposite sides of the coated optical fibers 11b, and integrally covering the coated optical fibers 11b and the tension members 17 with the cable jacket 16 having the rectangular cross-sectional shape of 2 mm×3 mm. The cable jacket 16 has a coating thickness of 0.8 mm in the direction orthogonal to the direction of arrangement of the coated optical fibers 11b. The cable jacket 16 is comprised of a nylon resin, which is a polyamide-based resin that does not contain any halogens and has a Young's modulus of 1200 MPa, a rupture elongation of 100%, and a flame retardancy of V2 according to UL Standards. As each tension member 17, a fiber material, with which high-strength polymer fibers are made integral by a polyester resin, is applied.

As the glass fiber 12 of each coated optical fiber 11b, a multimode glass fiber with a core diameter of 50 μm and a cladding diameter of 125 μm is applied. In the optical cable of Sample 1-2, the coating layer 13 is formed to an outer diameter of 200 μm on the outer periphery of the glass fiber 12. The coating layer 13 has a single layer structure of just a hard layer and is comprised of an ultraviolet curing acrylate resin with a Young's modulus of 1 MPa and a rupture elongation of 100%.

The colored layer 14 is formed on the surface of the coating layer 13 in the optical cable of Sample 1-2 as well. From the standpoint of making the colored layer 14 high in rupture elongation, the colored layer 14 is comprised of an ultraviolet curing acrylate resin with a colorant added so as to have a Young's modulus of 1200 MPa and a rupture elongation of 10% or more. The outer diameter of the colored layer 14 is 255 μm. Also, although in the optical cable of Sample 1-2, the colorant density is made low to increase the rupture elongation, the thinness of coloration is compensated by making the colored layer have a thickness of 27.5 μm and thus thicker than that in the optical cable of Sample 1-1.

As a result of conducting the impact resistance test according to the method shown in the area (b) of FIG. 1 on the optical cable of Sample 1-2 with the above-described arrangement, the collapse percentage of the cable jacket 16 of Sample 1-2 was found to be 16%. There was no damage of the coating layers 13 and the colored layers 14 of the coated optical fibers 11b, and, as a result of the temperature test of (−40° to 125° C.)×3 cycles, a transmission loss increase amount Δα of Sample 1-2 was less than 0.02 dB/20m. With respect to the standard of becoming fire extinguished in 70 seconds or less in the optical cable flame retardancy test (45° inclination test of ISO6722), the optical cable of Sample 1-2 was fire extinguished in 28 seconds.

The thermoplastic resin with the Young's modulus of 1200 MPa was applied as the cable jacket 16 in the optical cable of Sample 1-2, and by application of the resin with the Young's modulus of 200 MPa or more as in Sample 1-1, the collapse percentage of the cable jacket as determined by the test method shown in the area (b) of FIG. 1 could be suppressed to 25% or less. In regard to coating damage of the coated optical fiber 11b, significant damage can be prevented as long as the Young's modulus of the ultraviolet-curing resin coating layer 13 provided on the outer periphery of the glass fiber 12, is in a range of 0.5 MPa to 2 MPa and the Young's modulus of the colored layer 14 provided on the surface of the coating layer 13, is in a range of 500 MPa to 1500 MPa.

(Sample 1-3)

Figure 4:
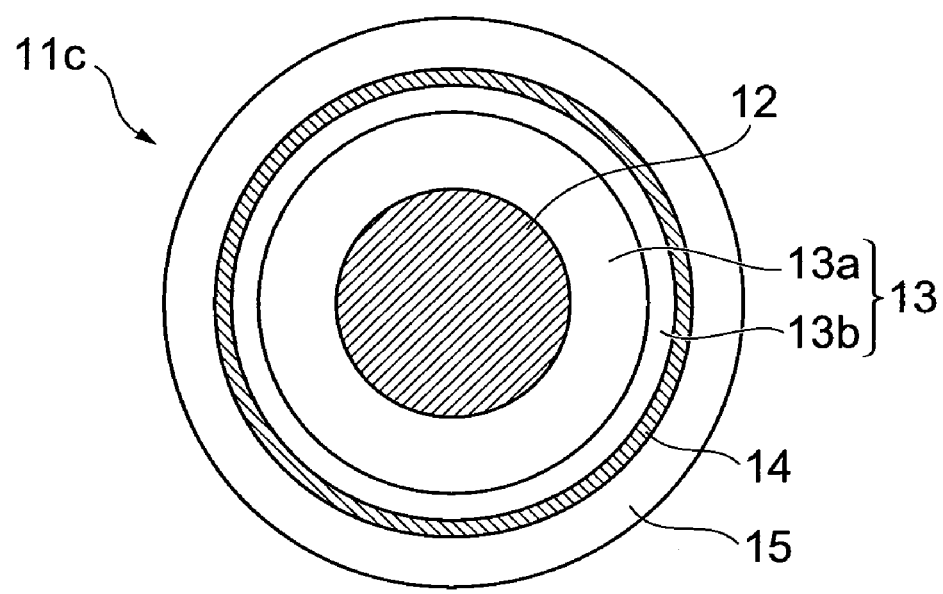
FIG. 4 is a diagram for explaining a cross-sectional structure of a coated optical fiber applied to a third sample (Sample 1-3) of the optical cable according to the first embodiment.

FIG. 4 is a diagram for explaining a cross-sectional structure of a coated optical fiber 11c applied to a third sample (Sample 1-3) of the optical cable 10 according to the first embodiment. The cross section shown in FIG. 4 corresponds to the cross section of the coated optical fiber 11 applied to the optical cable 10 shown in the area (a) of FIG. 1.

The optical cable of Sample 1-3 is obtained by arranging two of the coated optical fibers 11c (FIG. 4) in a column in the same manner as in Sample 1-1 and as shown in the area (a) of FIG. 1, positioning the tension members 17 at opposite sides of the coated optical fibers 11c, and integrally covering the coated optical fibers 11c and the tension members 17 with the cable jacket 16 having the rectangular cross-sectional shape of 2 mm×3 mm. The cable jacket 16 has a coating thickness of 0.7 mm in the direction orthogonal to the direction of arrangement of the coated optical fibers 11c. The cable jacket 16 is comprised of a nylon resin, which is a polyamide-based resin that does not contain any halogens and has a Young's modulus of 1200 MPa, a rupture elongation of 100%, and a flame retardancy of V2 according to UL Standards. As each tension member 17, a fiber material, with which high-strength polymer fibers are made integral by a polyester resin, is applied.

As the glass fiber 12 of each coated optical fiber 11c, a multimode glass fiber with a core diameter of 50 μm and a cladding diameter of 125 μm is applied. In the optical cable of Sample 1-3, the coating layer 13 is formed on the outer periphery of the glass fiber 12. The coating layer 13 has a two-layer structure constituted by the primary coating 13a (soft layer) and the secondary coating 13b (hard layer). The primary coating 13a is formed from the surface of the glass fiber 12 to an outer diameter of 200 μm and is comprised of an ultraviolet curing acrylate resin with a Young's modulus of 1 MPa and a rupture elongation of 100%. The secondary coating 13b is formed to an outer diameter of 245 μm on the surface of the primary coating 13a and is comprised of an ultraviolet curing acrylate resin with a Young's modulus of 800 MPa and a rupture elongation of 56%. Furthermore, the colored layer 14 is formed on the surface of the secondary coating 13b to an outer diameter of 255 μm, and the colored layer 14 is comprised of an ultraviolet curing acrylate resin with a Young's modulus of 1200 MPa and a rupture elongation of 2%.

In the optical cable of Sample 1-3, a protective layer 15 with a thickness of 125 μm is formed on the surface of the colored layer 14 from the standpoint of protecting the peripheries of the colored optical fibers 11c by a resin of low Young's modulus. The protective layer 15 is comprised of an ultraviolet curing acrylate resin with a Young's modulus of 50 MPa and a rupture elongation of 80%. Although the protective layer 15 is provided on each of the coated optical fibers 11c in the optical cable of Sample 1-3, a plurality of coated optical fibers, each coated up to the colored layer 14, may be coated integrally with a protective layer 15. In this case, the protective layer 15 takes on a tape-like shape in which the plurality of coated optical fibers are arranged in a column.

As a result of conducting the impact resistance test according to the method shown in the area (b) of FIG. 1 on the optical cable of Sample 1-3 with the above-described arrangement, the collapse percentage of the cable jacket 16 of Sample 1-3 was found to be 17%. There was no damage of the coating layers 13 (primary coatings 13a and secondary coatings 13b) and the colored layers 14 of the coated optical fibers 11c, and, as a result of the temperature test of (−40° to 125° C.)×3 cycles, a transmission loss increase amount Δα of Sample 1-3 was less than 0.02 dB/20m. With respect to the standard of becoming fire extinguished in 70 seconds or less in the optical cable flame retardancy test (45° inclination test of ISO6722), the optical cable of Sample 1-3 was fire extinguished in 29 seconds.

The thermoplastic resin with the Young's modulus of 1200 MPa was applied as the cable jacket 16 in the optical cable of Sample 1-3, and by application of the resin with the Young's modulus of 200 MPa or more as in Sample 1-1, the collapse percentage of the cable jacket as determined by the test method shown in the area (b) of FIG. 1 could be suppressed to 25% or less.

In regard to coating damage of the coated optical fiber 11c, when the Young's modulus of the ultraviolet curing resin of the protective layer 15 is less than 50 MPa, the protective layer tends to peel off readily in a crumbling manner when the coated optical fiber is wound around a bobbin prior to being incorporated in a cable. On the other hand, when the Young's modulus is 300 MPa or more, the impact absorption effect against the dropping of a weight is lowered. The primary coating 13a, comprised of the ultraviolet curing resin and provided on the surface of the glass fiber 12, preferably has a Young's modulus of 0.5 MPa to 2 MPa, and the colored layer 14 preferably has a Young's modulus of 200 MPa or more from the standpoint of preventing significant damage due to lateral pressure, etc. However, as the Young's modulus increases, the rupture elongation decreases, and from the standpoint of preventing ease of cracking, significant damage can be prevented if the Young's modulus of the colored layer 14 is 1500 MPa or less.

(Sample 1-4)

Figure 5:
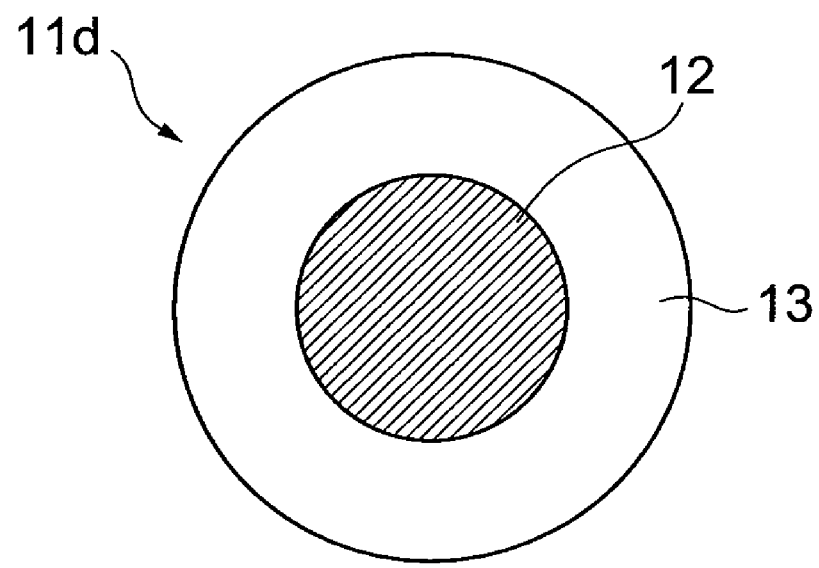
FIG. 5 is a diagram for explaining a cross-sectional structure of a coated optical fiber applied to a fourth sample (Sample 1-4) of the optical cable according to the first embodiment.

FIG. 5 is a diagram for explaining a cross-sectional structure of a coated optical fiber 11$d$ applied to a fourth sample (Sample 1-4) of the optical cable 10 according to the first embodiment. The cross section shown in FIG. 5 corresponds to the cross section of the coated optical fiber 11 applied to the optical cable 10 shown in the area (a) of FIG. 1. The structure of each coated optical fiber 11$d$ in the optical cable of Sample 1-4 is the same as that of Sample 1-1 without the colored layer 14.

The optical cable of Sample 1-4 is obtained by arranging two of the coated optical fibers 11$d$ (FIG. 5) in a column as shown in the area of FIG. 1, positioning the tension members 17 at opposite sides of the coated optical fibers 11$d$, and integrally covering the coated optical fibers 11$d$ and the tension members 17 with the cable jacket 16 having the rectangular cross-sectional shape of 2 mm×3 mm. The cable jacket 16 has a coating thickness of 0.9 mm in the direction orthogonal to the direction of arrangement of the coated optical fibers 11$d$. The cable jacket 16 is comprised of a nylon resin, which is a polyamide-based resin that does not contain any halogens and has a Young's modulus of 1200 MPa, a rupture elongation of 100%, and a flame retardancy of V2 according to UL Standards. As each tension member 17, a fiber material, with which high-strength polymer fibers are made integral by a polyester resin, is applied.

As the glass fiber 12 of each coated optical fiber 11$d$, a multimode glass fiber with a core diameter of 50 μm and a cladding diameter of 125 μm is applied. In the optical cable of Sample 1-4, the coating layer 13 is formed to an outer diameter of 170 μm on the outer periphery of the glass fiber 12 from the standpoint of making appropriate the Young's modulus of the coating layer 13. The coating layer 13 has a single layer structure of just a hard layer and is comprised of an ultraviolet curing acrylate resin with a Young's modulus of 800 MPa and a rupture elongation of 56%.

As a result of conducting the impact resistance test according to the method shown in the area (b) of FIG. 1 on the optical cable of Sample 1-4 with the above-described arrangement, the collapse percentage of the cable jacket 16 of Sample 1-4 was found to be 16%. There was no damage of the coating layers 13 of the coated optical fibers 11$d$, and, as a result of the temperature test of (−40° to 125° C.)×3 cycles, a transmission loss increase amount Δα of Sample 1-4 was 0.28 dB/20m.

The thermoplastic resin with the Young's modulus of 1200 MPa was applied as the cable jacket 16 in the optical cable of Sample 1-4, and by application of the resin with the Young's modulus of 200 MPa or more, the collapse percentage of the cable jacket as determined by the test method shown in the area (b) of FIG. 1 could be suppressed to 25% or less. With respect to the standard of becoming fire extinguished in 70 seconds or less in the optical cable flame retardancy test (45° inclination test of ISO6722), the optical cable of Sample 1-4 was fire extinguished in 30 seconds.

In regard to coating damage of the coated optical fiber 11$d$, significant damage can be prevented as long as the Young's modulus of the coating layer 13 comprised of the ultraviolet curing resin and provided on the glass fiber 12, is 200 MPa or more. However, when the cable jacket becomes too high in Young's modulus, it becomes high in bending rigidity and the cable becomes poor in flexibility. Also, when the Young's modulus becomes high, the rupture elongation decreases, and from the standpoint of preventing ease of cracking, the Young's modulus is preferably 1500 MPa or less. Furthermore, because when the cable jacket 16 becomes high in Young's modulus, it becomes low in rupture elongation, the Young's modulus is preferably 1200 MPa or less from the standpoint of long-term reliability.

(Sample 1-5)

Figure 6:
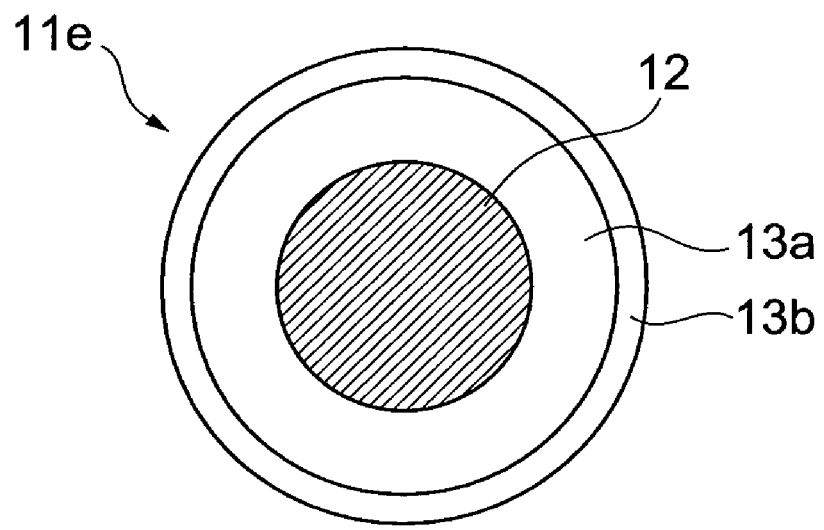
FIG. 6 is a diagram for explaining a cross-sectional structure of a coated optical fiber applied to a fifth sample (Sample 1-5) of the optical cable according to the first embodiment.

FIG. 6 is a diagram for explaining a cross-sectional structure of a coated optical fiber 11$e$ applied to a fifth sample (Sample 1-5) of the optical cable 10 according to the first embodiment. The cross section shown in FIG. 6 corresponds to the cross section of the coated optical fiber 11 applied to the optical cable 10 shown in the area (a) of FIG. 1. The structure of each coated optical fiber 11$e$ in the optical cable of Sample 1-5 is practically the same as that of Sample 1-3 without the colored layer 14 and the protective layer 15.

The optical cable of Sample 1-5 is obtained by arranging two of the coated optical fibers 11$e$ (FIG. 6) in a column in the same manner as in Sample 1-1 and as shown in the area (a) of FIG. 1, positioning the tension members 17 at opposite sides of the coated optical fibers 11$e$, and integrally covering the coated optical fibers 11$e$ and the tension members 17 with the cable jacket 16 having the rectangular cross-sectional shape of 2 mm×3 mm. The cable jacket 16 has a coating thickness of 0.7 mm in the direction orthogonal to the direction of arrangement of the coated optical fibers 11$e$. The cable jacket 16 is comprised of a nylon resin, which is a polyamide-based resin that does not contain any halogens and has a Young's modulus of 1200 MPa, a rupture elongation of 100%, and a flame retardancy of V2 according to UL Standards. As each tension member 17, a fiber material, with which high-strength polymer fibers are made integral by a polyester resin, is applied.

As the glass fiber 12 of each coated optical fiber 11$e$, a multimode glass fiber with a core diameter of 50 μm and a cladding diameter of 125 μm is applied. In the optical cable of Sample 1-5, the coating layer 13 is formed on the outer periphery of the glass fiber 12. The coating layer 13 has a two-layer structure constituted by the primary coating 13$a$ (soft layer) and the secondary coating 13$b$ (hard layer). The primary coating 13$a$ is formed from the surface of the glass fiber 12 to an outer diameter of 200 μm and is comprised of an ultraviolet curing acrylate resin with a Young's modulus of 1 MPa and a rupture elongation of 100%. The secondary coating 13$b$ is formed to an outer diameter of 245 μm on the surface of the primary coating 13$a$ and is comprised of an ultraviolet curing acrylate resin with a Young's modulus of 800 MPa and a rupture elongation of 56%. Each of the coated optical fibers 11$e$ of Sample 1-5 does not have the colored layer 14 and the protective layer 15 such as those of Sample 1-3.

As a result of conducting the impact resistance test according to the method shown in the area (b) of FIG. 1 on the optical cable of Sample 1-5 with the above-described arrangement, the collapse percentage of the cable jacket 16 of Sample 1-5 was found to be 18%. There was no damage of the coating layers 13 (primary coatings 13$a$ and secondary coatings 13$b$) of the coated optical fibers 11$e$, and, as a result of the temperature test of (−40° to 125° C.)×3 cycles, a transmission loss increase amount Δα of Sample 1-5 was less than 0.02 dB/20m. With respect to the standard of becoming fire extinguished in 70 seconds or less in the optical cable flame retardancy test (45° inclination test of ISO6722), the optical cable of Sample 1-5 was fire extinguished in 29 seconds.

The thermoplastic resin with the Young's modulus of 1200 MPa was applied as the cable jacket 16 in the optical cable of Sample 1-5, and by application of the resin with the Young's modulus of 200 MPa or more as in Sample 1-1, the collapse percentage of the cable jacket as determined by the test method shown in the area (b) of FIG. 1 could be suppressed to 25% or less.

Comparative Example 1-1

A first comparative example (Comparative Example 1-1) of the optical cable 10 according to the first embodiment will now be explained. The structure of the optical cable of Comparative Example 1-1 is the same as the cable structure shown in the area (a) of FIG. 1 (the same cable structure as those of Samples 1-1 to 1-5). However, in the optical cable of Comparative Example 1-1, a non-halogen-containing polyolefin resin having a Young's modulus of 100 MPa, a rupture elongation of 200%, and a flame retardancy of V0, which is higher in flame retardancy than V2 according to UL Standards, is applied as the thermoplastic resin of the cable jacket 16. Similar to the coated optical fiber of FIG. 4 (the coated optical fiber 11c applied to the optical cable of Sample 1-3), the coated optical fiber has a coating layer with a two-layer structure. In this coating layer, a primary coating (soft layer) is formed to an outer diameter of 200 μm on a surface of a glass fiber, and the primary coating is comprised of an ultraviolet curing acrylate resin with a Young's modulus of 1 MPa and a rupture elongation of 100%. A secondary coating (hard layer) is formed to an outer diameter of 245 μm on a surface of the primary coating, and the secondary coating is comprised of an ultraviolet curing acrylate resin with a Young's modulus of 800 MPa and a rupture elongation of 56%. Furthermore, a colored layer is formed to an outer diameter of 255 μm on a surface of the secondary coating, and the colored layer is comprised of an ultraviolet curing acrylate resin with a Young's modulus of 1200 MPa and a rupture elongation of 2%. Unlike the coated optical fiber of Sample 1-3, the coated optical fiber of the optical cable of Comparative Example 1-1 does not have a protective layer.

As a result of conducting the impact resistance test according to the method shown in the area (b) of FIG. 1 on the optical cable of Comparative Example 1-1 with the above-described arrangement, the collapse percentage of the cable jacket was found to be 50%. Also, separation of the ultraviolet curing resin coating was seen at an interface with the glass of the coated optical fiber, and damage of the colored layer was also seen. As a result of the temperature test of (−40° to 125° C.)×3 cycles, a transmission loss increase amount Δα of Comparative Example 1-1 was 0.02 dB/20m. With respect to the standard of becoming fire extinguished in 70 seconds or less in the optical cable flame retardancy test (45° inclination test of ISO6722), the optical cable of Comparative Example 1-1 was fire extinguished in 25 seconds.

Comparative Example 1-2

A second comparative example (Comparative Example 1-2) of the optical cable 10 according to the first embodiment also has the cable structure shown in the area (a) of FIG. 1. However, unlike Comparative Example 1-1, a nylon resin, which is a non-halogen-containing polyamide resin and has a Young's modulus of 1200 MPa, a rupture elongation of 100%, and a flame retardancy of V2 according to UL Standards, is applied as the thermoplastic resin of the cable jacket 16. Similar to Sample 1-3 shown in FIG. 4, the coating layer of the coated optical fiber has a two-layer structure constituted by a primary coating and a secondary coating. That is, the primary coating is formed to an outer diameter of 200 μm on a surface of a glass fiber, and the primary coating is comprised of an ultraviolet curing acrylate resin with a Young's modulus of 1 MPa and a rupture elongation of 100%. The secondary coating is formed to an outer diameter of 245 μm on a surface of the primary coating, and the secondary coating is comprised of an ultraviolet curing acrylate resin with a Young's modulus of 800 MPa and a rupture elongation of 56%. Furthermore, a colored layer is formed to an outer diameter of 255 μm on a surface of the secondary coating, and the colored layer is comprised of an ultraviolet curing acrylate resin with a Young's modulus of 1200 MPa and a rupture elongation of 2%. The coated optical fiber does not have a protective layer in Comparative Example 1-2 as well (as is the case with Comparative Example 1-1).

As a result of conducting the impact resistance test according to the method shown in the area (b) of FIG. 1 on the optical cable of Comparative Example 1-2 with the above-described arrangement, the collapse percentage of the cable jacket was found to be 15%. However, separation of the ultraviolet curing resin coating was seen at an interface with the glass of the coated optical fiber, and damage of the colored layer was also seen. As a result of the temperature test of (−40° to 125° C.)×3 cycles, a transmission loss increase amount Δα of Comparative Example 1-2 was 0.02 dB/20m. With respect to the standard of becoming fire extinguished in 70 seconds or less in the optical cable flame retardancy test (45° inclination test of ISO6722), the optical cable of Comparative Example 1-2 was fire extinguished in 35 seconds.

FIG. 7 is a table of results of judging impact and temperature characteristics as durability performance of Sample 1-1 to Sample 1-5, Comparative Example 1-1, and Comparative Example 1-2 of the optical cable 10 according to the first embodiment. In FIG. 7 are shown results of comprehensive quality judgments of the collapse percentage of the cable jacket, presence or non-presence of damage of the coated optical fibers (as checked visually or by touching with a hand), and increase amount of transmission loss resulting from the heat cycle test. The structure of the optical cable is the same for all samples, and Samples 1-1 to 1-5 have the nylon resin with a Young's modulus of 1200 MPa and rupture elongation of 100% applied to the cable jacket and differ from each other in the structures and materials of the coating layers of the coated optical fibers. On the other hand, Comparative Examples 1-1 and 1-2, though being the same as each other in the structure of the coated optical fiber (each has the double structure coating layer as in Sample 1-3), differ from each other in the material of the cable jacket.

The collapse percentage of the cable jacket is judged from the result of dropping the weight with the diameter of 30 mm and the mass of 1 kg onto the optical cable subject to measurement from 50 mm above the optical cable as shown in the area (b) of FIG. 1. As the judgment standards, a "good" judgment is made when the collapse percentage is 25% or less and a "poor" judgment is made when the collapse percentage is 25% or more. The presence or non-presence of damage of the coated optical fiber is judged by checking for separation of the coating, collapse, etc., visually or by touching with the hand. The increase of transmission loss was measured upon performing the temperature test of (−40° to 125° C.)×3 cycles and a "good" judgment is made when the loss increase is 0.5 dB/20m or less.

As can be understood from the judgment results shown in FIG. 7, for the temperature test of (−40° to 125° C.)×3 cycles, results indicating that there are no problems in terms of practical use were obtained for all samples. Although in comparison to the other samples, the transmission loss of the optical cable of Sample 1-1 increases by 0.3 dB/20m, this is within an allowable range for optical LAN communication and inter-equipment wiring used within a range of approximately 20m.

In regard to the impact test, Samples 1-1 to 1-5 and Comparative Example 1-2 clear the standard of jacket collapse of 25% or less. Regarding Samples 1-1 to 1-5, core damage was not seen in either of the coating layer and colored layer of the coated optical fiber, and along with the temperature characteristics, these samples were comprehensively judged to be "good." Regarding Comparative Example 1-1 and Comparative Example 1-2, damage was seen in the colored layer of the coated optical fiber and these samples were comprehensively judged to be "poor."

(Second Embodiment)

A second embodiment of an optical cable according to the present invention will now be explained in detail with reference to FIGS. 8 to 13. FIG. 8 shows diagrams of basic structures (cross-sectional structures) and an outer appearance of the second embodiment of the optical cable according to the present invention. In particular, the area (a) of FIG. 8 shows a first cross-sectional structure (rectangular shape) of the optical cable 20 according to the second embodiment, the area (b) of FIG. 8 shows a second cross-sectional structure (elliptical shape) of the optical cable 20 according to the second embodiment, and the area (c) of FIG. 8 shows an example of a LAN optical cable (with an optical connector being attached) to which the optical cable 20 is applied. Similar to the first embodiment, the optical cable 20 according to the second embodiment comprises the coated optical fibers 11, the tension members 17 disposed along the coated optical fibers 11 at opposite sides of the coated optical fibers 11, and the cable jacket 16 integrally covering the coated optical fibers 11 and the tension members 17. Each coated optical fiber 11 comprises the bared fiber (glass fiber) 12, the coating layer 13 provided on the outer periphery of the glass fiber 12, and the colored layer 14 provided on the surface of the coating layer 13. The glass fiber 12 comprises the core extending along the predetermined axis and having the predetermined refractive index, and the cladding provided on the outer periphery of the core and having the refractive index lower than that of the core. The coating layer 13 may have the multilayer structure constituted by the primary coating (soft layer) 13a and the secondary coating (hard layer) 13b, or may have the single layer structure constituted by just the hard layer.

The optical cable 20 according to the second embodiment is an optical cable for optically connecting between a plurality of information equipments installed indoors or inside a vehicle and is an optical cable (LAN optical cable) suited for use as optical wiring of comparatively short in length (for example, approximately 1 m to 20 m) in a LAN or inter-equipment wiring, etc. As shown for example in the area (a) of FIG. 8, this type of optical cable is obtained by arranging the coated optical fibers 11 in a column, positioning the tension members 17 at opposite sides of the coated optical fibers 11, and integrally covering the coated optical fibers 11 and the tension members 17 with the cable jacket 16. In the second embodiment, the tension members 17 positioned inside the cable jacket 16 may be eliminated.

As the glass fiber 12 of each coated optical fiber 11, a multimode glass fiber 12, which is comprised of silica glass and has a core diameter of 50 μm and a cladding diameter of 125 μm, can be applied. The silica-based optical fiber, mainly comprised of silica glass, may be one whose core and cladding are comprised of silica glass, or one whose core only is comprised of silica glass and whose cladding is comprised of hard plastic.

Each coated glass fiber 11 comprises the glass fiber 12, the coating layers 13a and 13b (comprised of an ultraviolet curing acrylate resin and having an outer diameter of approximately 245 μm), coated on the surface of the glass fiber 12, and the colored layer 14, provided on the surface of the coating layer 13B. The coating layer preferably has the two-layer structure of the primary coating 13a (soft layer) and the secondary coating 13b (hard layer). In this case, by making a Young's modulus of the primary coating 13a lower than a Young's modulus of the secondary coating 13b, the coated optical fiber 11 can be provided with a cushioning function against lateral pressure. Thus, in the coated optical fiber 11 having the coating layer 13 of such a multilayer structure, occurrence of microbending can be suppressed effectively and good light transmitting characteristics can be maintained.

In the optical cable 20 according to the second embodiment, two or more coated optical fibers 11 are arranged next to each other, the tension members 17 are disposed at opposite sides of the coated optical fibers 11, and the optical cable 10 is obtained by covering the coated optical fibers 11 and the tension members 17 integrally by the cable jacket 16 (integration of the coated optical fibers and the cable jacket). In the second embodiment, the tension members 17 do not have to be positioned. Here, "integration of the coated optical fibers and the cable jacket" refers to a state where the coated optical fibers 11, embedded in the cable jacket 16, directly contact the cable jacket 16 and can cooperatively accommodate tensile stress. As shall be described below, as long as a pulling tension of no less than a predetermined value can be secured for the optical cable as a whole, there are cases where the tension members 17 are not required in particular in a form of use, such as LAN wiring, where a large tension is not applied constantly.

The cable jacket 16 is comprised of a thermoplastic resin, such as a nylon resin, polyethylene (PE), polyvinyl chloride (PVC), etc., and as shown in the areas (a) and (b) of FIG. 8, has a cross section of rectangular or elliptical shape. The cable jacket 16 is formed by solid extrusion. Solid extrusion is the method of extruding while applying pressure to the coated optical fibers 11, etc., so as to compress the extruded resin at the inner side of the die of the resin extruder. The extruded resin is in the compressed state inside the die, and the thermoplastic resin that is extruded onto the outer peripheries of the coated optical fibers 11 can be made to be in highly close contact with the coated optical fibers 11 as the cable jacket 16. By the cable jacket 16 being in close contact with the coated optical fibers 11, meandering of the coated optical fibers 11 inside the cable jacket 16 can be prevented when the cable jacket 16 shrinks.

Although the rupture elongation of the coated optical fiber 11 is generally 5% or more, even in an elongation no more than the rupture elongation, when the elongated state is sustained, static fatigue arises due to growth of cracks present in the glass and breakage occurs at a certain probability with the elapse of time. In consideration of rupture life of the fiber glass portion, it is important to set an appropriate screening level for drawing of the coated optical fiber. When the screening level is 1.5%, even when, during wiring of the optical cable, the coated optical fiber is subject to an elongation of 1% that corresponds to 2/3 of the screening level, the probability of glass rupture after 10 years can be suppressed to an extremely low value of 1/1,000,000 or less.

In the optical cable according to the present invention, since the coated optical fibers and the cable jacket are integrated, elongation of the optical fibers and elongation of the cable are substantially equal. Thus by suppressing the cable jacket elongation to 1% or less, the optical fiber elongation can also be suppressed to 1% or less substantially and the rupture probability of glass can be suppressed to an extremely low level. The overall pulling tension of the optical fiber cable when the optical cable is elongated by 1% along its longitudinal direction thus refers to the pulling tension when the optical cable is elongated by 1% while holding the cable jacket, and the pulling tensions of other members, such as the coated optical fibers made integral with the cable jacket, are incorporated therein.

When the optical cable 20 is applied to LAN wiring for indoors, etc., or to inter-equipment wiring, it suffices to assume application of a pulling tension of approximately 50 N. Thus, as a practical optical cable, it suffices that the entirety, including the coated optical fibers 11, the tension members 17, and the cable jacket 16 that constitute the cable 20, has a tensile strength that can withstand a tension of 50 N (or preferably, 70 N, which is deemed to be a generally allowable tension). Because, as LAN wiring or inter-equipment wiring, an optical cable of thin shape is desired along with reduction of wiring space and improvement of handling properties, the cable jacket 16 is made to have a directionality in bending direction by a rectangular or elliptical cross-sectional shape with external dimensions of 4 mm or less (preferably, a rectangular cross section of 2 mm×3 mm) and is arranged so as not to include any metal wiring materials that undergo metal fatigue readily as a tensile strength member.

Also as shown in the area (c) of FIG. 8, the optical cable 20 according to the second embodiment is used in many cases with an optical connector 9 or other connecting portion of an optical part, such as a light source module, light receiving module, etc., being attached to an end, and is required to have a good optical part attachment property. For example, in regard to the property of attaching the optical connector 9, because the coated optical fibers 11 and the cable jacket 16 are integrated, the optical connector 9 can be fixed by just holding the cable jacket 16 and workability of attachment is thus simple and good. Even when the cable jacket 16 is held and fixed at the optical connector 9, in the condition that the Young's modulus of the cable jacket 16 is low, just the cable jacket may become elongated by pulling the optical connector 9. The Young's modulus of the cable jacket 16 is thus set to 200 MPa or more and preferably 300 MPa or more, and the comprehensive pulling tension of the optical cable 20, including the coated optical fibers 11 and the cable jacket 16, when the optical cable is elongated by 1% in its longitudinal direction is preferably 50 N or more, which is a tensile standard for general optical connectors.

In the optical cable 20 according to the second embodiment, because the cable jacket 16 and the coated optical fibers 11 are integrated, the coated optical fibers 11 tend to undergo microbending and readily increase in transmission loss at low temperature. Thus normally, a rod-like wire (FRP rod), formed by binding high-strength fibers with resin and counters shrinking of the cable jacket, is used not only as the tension member (tensile strength member) but also as an antishrinking member. An embodiment that is used without priority given to bending properties of the cable is also possible.

In a case where an antishrinking member is not used, a soft layer (primary coating 13a) with a low Young's modulus is preferably provided on the glass fiber 12 surface of each coated optical fiber 11 as the coating layer of the coated optical fiber 11 in the optical cable 20 so that influences of microbending are not received readily. In particular, from a standpoint of resistance against external flaws, a coating with a Young's modulus of 10 MPa or less, which is lower by approximately two orders of magnitude in comparison to the Young's modulus of 800 MPa to 1200 MPa employed in the outermost layer (secondary coating or colored layer 14) of the coated optical fiber 11, can be provided between the surface of the glass fiber 12 and the outermost layer to increase the microscopic bending diameter of microbending. In this case, transmission loss can be maintained at a satisfactory level even under low temperature. Because, in the condition that the primary coating 13a is too soft, the position of the silica glass becomes unstable and worsening of eccentricity occurs, the Young's modulus of the primary coating 13a is preferably 0.1 MPa or more.

In accordance with the optical cable having the above-described structure, a tension that is temporarily applied during installation can be withstood adequately. Moreover, the optical cable exhibits a high bending performance of not undergoing rupture in a test of bending 100,000 times to 90° to the left and right at a curvature radius R of 9 mm and is also excellent in optical connector attachment workability.

(Sample 2-1)

Figure 9:
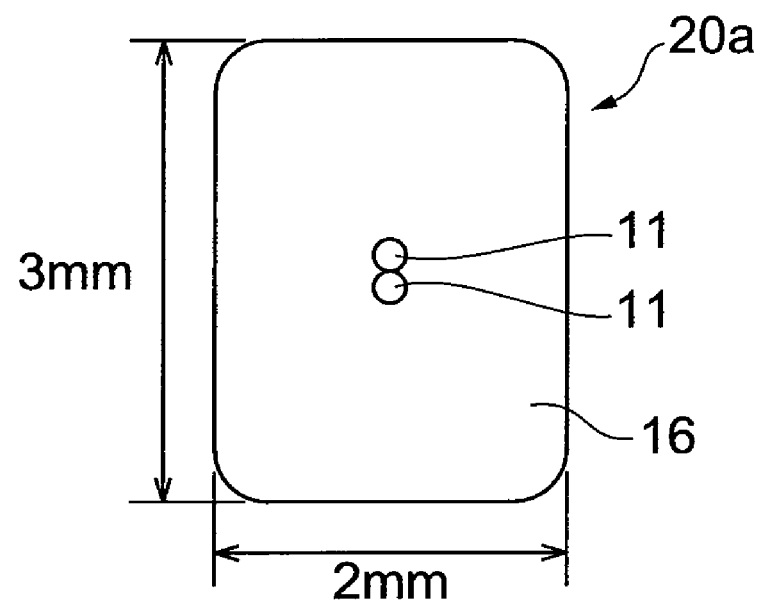
FIG. 9 is a diagram for explaining a cross-sectional structure of a first sample (Sample 2-1) of the optical cable according to the second embodiment.

FIG. 9 is a diagram of a cross-sectional structure of a first sample (Sample 2-1) of the optical cable according to the second embodiment.

In the optical cable 20a of Sample 2-1, a tension member is not present inside the cable jacket 16. The optical cable 20a of Sample 2-1 is obtained by arranging two of the coated optical fibers 11 in a column and integrally covering the coated optical fibers 11 with the cable jacket 16 of 2 mm×3 mm. A multimode glass fiber with a core diameter of 50 μm and a cladding diameter of 125 μm is applied as the glass fiber 12 of each coated optical fiber 11. The coating layer 13 is formed to an outer diameter of 250 μm from the surface of the glass fiber 12. The coating layer 13 is comprised of ultraviolet curing acrylate resins and is constituted by the primary coating 13a and the secondary coating 13b. The primary coating 13a is formed to an outer diameter of 200 μm from the surface of the glass fiber 12 and has a low Young's modulus of 1 MPa. The secondary coating 13b formed to 250 μm from the surface of the primary coating 13a has a Young's modulus of 800 MPa. The cable jacket 16 is formed by solid extrusion molding of a nylon resin with a Young's modulus of 1200 MPa.

An elongation rigidity of the optical cable 20a of Sample 2-1 with the above-described structure shall now be described. The elongation rigidity is a value expressed as a product ES (units: N) of a Young's modulus E and a cross-sectional area S. In the case of the optical cable 20a of Sample 2-1, under an environment of 23° C., the glass fiber 12 has a diameter of 125 μm and a Young's modulus of 68.6 GPa, and the elongation rigidity of the two glass fiber portions is thus 1.7 kN. Since the cable jacket 16 has the outer shape of 2 mm×3 mm and the Young's modulus of 1200 MPa, the elongation rigidity of the cable jacket 16 is 7.2kN. When the screening level of the coated optical fiber 11 is 1.5%, the coated optical fiber 11 can be elongated to 1% in its longitudinal direction. The overall pulling tension of the optical cable 20a when the optical cable 20a is elongated by 1% along its longitudinal direction is thus 89 N and can thus exceed a tension of 50 N, which is generally allowable in normally assumable indoor work. In this case, when the cable jacket 16 has a Young's modulus of 500 MPa or more, the tension of 50 N, which is generally allowable in normally assumable indoor work, can be exceeded.

However, when the Young's modulus of the cable jacket 16 becomes high, a cable bending rigidity becomes high and the cable becomes difficult to bend and thus poor in handling properties. The Young's modulus of the cable jacket 16 is thus preferably restrained at approximately 1500 MPa. To improve the tensile strength properties of the cable jacket 16, enlargement of the cross-sectional area of the cable jacket 16 may also be considered. However, in consideration of wiring space of the optical cable, etc., the optical cable preferably has an external dimension (maximum outer diameter) of 4 mm or less. In consideration of this point, to make the overall pulling tension of the optical cable 20a (when the optical cable 20a is elongated by 1% along the longitudinal direction) 70 N or more, the Young's modulus of the cable jacket 16 must be 200 MPa or more.

In regard to the bending performance of the optical cable, when bending to a bending radius of 9 mm, which is slightly less than five times the dimension of the shorter dimension side (2 mm width) of the cable cross section (2 mm×3 mm), is performed, the bending distortion applied to the glass fiber portion of the coated optical fiber 11 falls within 0.7% at the most and thus 1% or less. Since a life of glass is mainly determined by a cumulative time of distortion, the influence of the number of times of bending is small, and unlike a steel wire that undergoes metal fatigue, glass is a material that is less likely to undergo dynamic fatigue. Thus, even when bending at a bending radius of 9 mm is applied 100,000 times in reciprocation (refer to example of bending test of FIG. 5), the probability of rupture of glass is low and $1/1,000,000$ or less and glass thus does not undergo breakage in practical use.

The rupture elongation of the nylon resin used in the cable jacket 16 is 100% and differs by one order of magnitude from the bending distortion applied to the cable jacket during bending. Cracks and other damages thus did not occur in the cable jacket 16. Furthermore, it was found that in order so that cracks do not form in the cable jacket 16 even when bent 100,000 times in reciprocation at the bending radius of 9 mm, which is slightly less than five times the dimension of the shorter dimension side of the cable cross section, the rupture elongation of the cable jacket 16 should be set to no less than approximately ten times the maximum distortion of 10% that is applied to the cable jacket 16, that is, to 100% or more.

In the optical cable 20a of Sample 2-1, although a nylon resin is used in the cable jacket 16, polyurethane resins, polyethylene resins, etc., are also as high in Young's modulus as nylon resins, and selection can be made from a wide variety of resins. Also, by selecting a resin with a melting point of approximately 150° C., wiring in a high temperature environment of approximately 125° C., such as in a periphery of an engine of an automobile, is also enabled.

In Sample 2-1, the result of the temperature test of (−40° to 125° C.)×3 cycles was a transmission loss increase amount Δα of 0.02 dB/20m and thus good. By applying a soft coating resin with a Young's modulus of 10 MPa or less on the surface of the glass fiber 12 as the primary coating 13a (soft layer) formed to an outer diameter of 150 μm or more from the surface of the glass fiber 12, the transmission loss increase amount Δα of Sample 2-1 can be suppressed to 0.1 dB/km or less. However, since the glass fiber 12 cannot be fixed firmly and the eccentricity becomes high in the case that the primary coating 13a is too low in Young's modulus, the Young's modulus of the primary coating 13a is preferably 0.1 MPa or more. In regard to the optical connector attachment property, in the case of the optical cable 20a of Sample 2-1, because the coated optical fibers 11 and the thermoplastic resin of the cable jacket 16 are integrated in a closely contacting state, fixing can be achieved simply by holding of the cable jacket 16 by a holding portion of an optical connector and attachment can thus be achieved readily.

(Sample 2-2)

Figure 10:
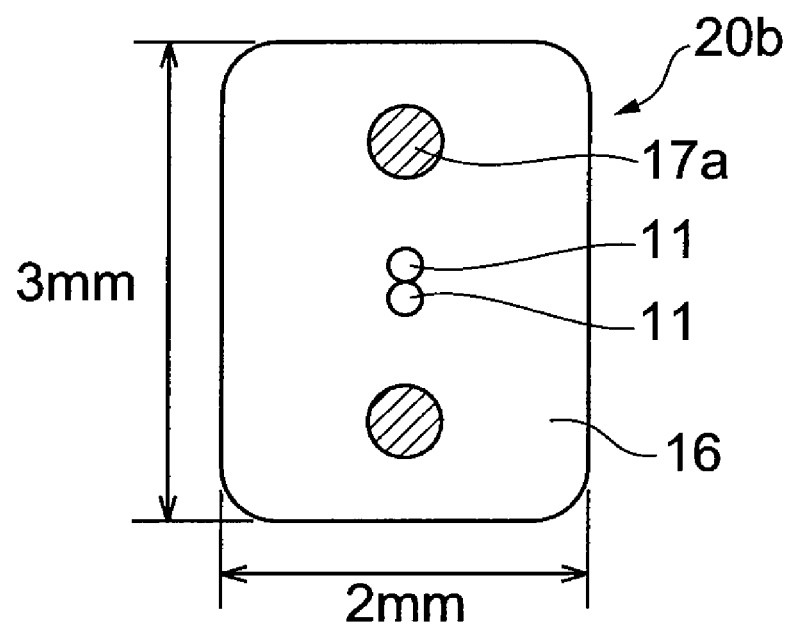
FIG. 10 is a diagram for explaining a cross-sectional structure of a second sample (Sample 2-2) of the optical cable according to the second embodiment.

FIG. 10 is a diagram of a cross-sectional structure of a second sample (Sample 2-2) of the optical cable according to the second embodiment.

In the optical cable 20b of Sample 2-2, tension members 17a, constituted by high-strength fibers, are embedded inside the cable jacket 16. The optical cable 20b of Sample 2-2 is obtained by arranging two of the coated optical fibers 11 in a column as in Sample 2-1 of FIG. 9, positioning high-strength fiber bundles as the tension members 17a at opposite sides of the coated optical fibers 11, and integrally covering the coated optical fibers 11 and the tension members 17a with the cable jacket 16 of 2 mm×3 mm. A multimode glass fiber with a core diameter of 50 μm and a cladding diameter of 125 μm is applied as the glass fiber 12 of each coated optical fiber 11. On the outer periphery of the glass fiber 12, the coating layer 13, comprised of an ultraviolet curing acrylate resin, is formed to an outer diameter of 250 μm from the surface of the glass fiber 12. The cable jacket 16 is formed by solid extrusion molding of a soft (Young's modulus: 100 MPa) polyolefin resin.

PBO (poly-p-phenylenebenzobisoxazole) polymer fibers with a Young's modulus of 180 GPa (and with a diameter of approximately 0.4 mm when bundled) are applied in the high-strength fiber bundle. Since a resin pressure can be set to a high value of 500 MPa at die and point portions of the extruder in the case that solid extrusion is performed, the high-strength fibers can be bound strongly by the resin of the jacket. Thus, even when the optical cable 20b is pulled at its terminal portion of just the cable jacket being held, the applied tension is transmitted reliably to the high-strength fiber bundles. Also, since ultrathin high-strength fibers of micron order are bound by the cable jacket 16 in the case of cutting by a nipper or other general-purpose tool is performed, the high-strength bundles do not become frayed and cutting can be performed easily. A density of the high-strength fibers is specifically approximately 15,000 dtex/mm$^2$ (13,500 denier/mm$^2$).

This density can be said to be a "density such that a force of extracting the high-strength fiber bundle from the cable jacket is 50 N/cm or more." Since the high-strength fibers do not become extracted even when the cable jacket 16 is pulled at a tension of 50 N with the length of the jacket held by the optical connector being approximately 1 cm, the applied tension is transmitted reliably to the high-strength fiber bundles. In manufacturing the high-strength fibers, manufacture can be performed with a back tension being set to a low value of approximately 2 N.

In regard to the elongation rigidity of the optical cable 20b of Sample 2-2, for example, the elongation rigidity (ES product) of the high-strength polymer fiber bundles is 45 kN, the elongation rigidity of the fiber glass portion is 1.7kN, and the elongation rigidity of the cable jacket 16 is 0.6kN. Thus, for example, even with an optical fiber of low strength with a low screening level of 0.3% that can be elongated only by up to 0.2%, the allowable tension of the optical cable 20b is 94 N and can thus be made to exceed the tension of 50 N that is encountered in normally assumable indoor work or the generally allowable tension of 70 N.

In regard to the bending performance of the optical cable 20b, when for example, the optical cable 20b is bent in the shorter dimension directions at a bending radius R of 9 mm as in Sample 2-1 in FIG. 9, it is calculated that a maximum distortion of 2% is applied when the high-strength polymer fiber bundles, each of 0.4 mm diameter, are completely fixed by the cable jacket 16. However in actuality, because only the peripheries of the high-strength fiber bundles are held by the soft thermoplastic resin of the cable jacket 16, the high-strength fibers, though encountering friction among the fibers, can move slightly in the longitudinal direction. Thus, even when the optical cable 20b is bent, the maximum distortion that arises in the high-strength fibers is reliably relaxed below 2% and made less likely to rupture. In order to make the high-strength fibers become shifted with respect to each other when the optical cable 20b is bent, the extraction force of the high-strength fiber bundles is preferably 900 N/cm or less, which corresponds to the tension when the maximum distortion of 2% occurs. Although the extraction force of the high-strength fiber bundles is indicated here, the force for extracting the high-strength fibers one by one or extracting a portion of the high-strength fibers is no more than a value obtained by multiplying by a cross-sectional ratio with respect to the high-strength fiber bundles.

Each tension member 17a in the optical cable 20b of Sample 2-2 is a bundle of ultrafine fibers of micron scale, and the fibers are independent of each other. Thus, even when a fiber at a location at which the maximum distortion occurs becomes cut, the other fibers are not greatly influenced by the cut fiber. Also, although in Sample 2-2, an example of using PBO fibers as the tension members 17a applied is described, aramid fibers and other high-strength polymer fibers or carbon fibers, which are inorganic fibers, etc., may be applied instead. Since carbon fibers have a conducting property, the fibers can be made to function to supply electricity to a light emitting element or a light receiving element. Thus, carbon fibers make it possible to provide bending characteristics and conductive properties at the same time, which was impossible with metal wires. In regard to the attachment property of the optical connector 9, because the coated optical fibers 11 and the high-strength fibers (tension members 17a) are integrated in close contact with the thermoplastic resin of the cable jacket 16, fixing can be achieved and attachment can be performed readily by simply making the cable jacket 16 be held by the holding portion of the optical connector 9.

(Sample 2-3)

Figure 11:
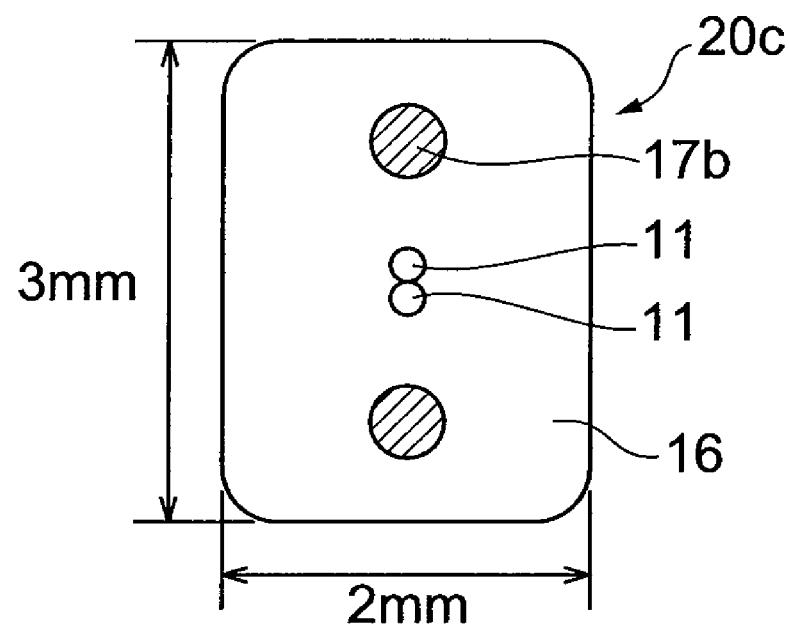
FIG. 11 is a diagram for explaining a cross-sectional structure of a third sample (Sample 2-3) of the optical cable according to the second embodiment.

FIG. 11 is a diagram of a cross-sectional structure of a third sample (Sample 2-3) of the optical cable according to the second embodiment.

In the optical cable 20c of Sample 2-3, high-strength FRP (fiber reinforced plastics) are embedded as tension members 17b inside the cable jacket 16. The optical cable 20c of Sample 2-3 is obtained by arranging two of the coated optical fibers 11 in a column as in Sample 2-1 of FIG. 9, positioning rod-like members of the high-strength FRP as the tension members 17b at opposite sides of the coated optical fibers 11, and integrally covering the coated optical fibers 11 and the tension members 17a with the cable jacket 16 of 2 mm×3 mm. A multimode glass fiber with a core diameter of 50 μm and a cladding diameter of 125 μm is applied as the glass fiber 12 of each coated optical fiber 11. On the outer periphery of the glass fiber 12, the coating layer 13, comprised of an ultraviolet curing acrylate resin, is formed to an outer diameter of 250 μm from the surface of the glass fiber 12. The cable jacket 16 is formed by solid extrusion molding of a soft (Young's modulus: 100 MPa) polyolefin resin.

As the high-strength FRP, rod-like members with an outer diameter of approximately 0.4 mm that are obtained by impregnating PBO (poly-p-phenylenebenzobisoxazole) polymer fibers, having a Young's modulus of 180 GPa, with a polyester-based resin are applied. Glass fibers, carbon fibers, etc., which are inorganic fibers may be used instead of the high-strength FRP. In regard to the elongation rigidity of the optical cable 20c of Sample 2-3, high-strength fibers of the same material quality and dimensions as those of Sample 2-2 of FIG. 10 are provided. Thus even with the low-strength coated optical fiber 11 of a low screening level of 0.3% that can be elongated only by up to 0.2%, the allowable tension of the optical cable 20b is 94 N and can thus be made to exceed the tension of 50 N that is encountered in normally assumable indoor work or the generally allowable tension of 70 N.

In regard to the bending performance of the cable 20c, the high-strength fibers are impregnated with the polyester-based matrix resin. Thus in regard to the bending performance, unlike Sample 2-2 of FIG. 10, with which the peripheries of the high-strength fiber bundles are held by the soft, thermoplastic resin, the high-strength fibers cannot move in the longitudinal direction and relax the distortion when the cable 20c is bent. Each rod-like member high-strength FRP is thus preferably formed so that its thickness in the direction orthogonal to the direction of arrangement of the coated optical fibers 11 (that is, the shorter dimension side bending direction) is a thickness that withstands the predetermined bending test.

Figure 12:
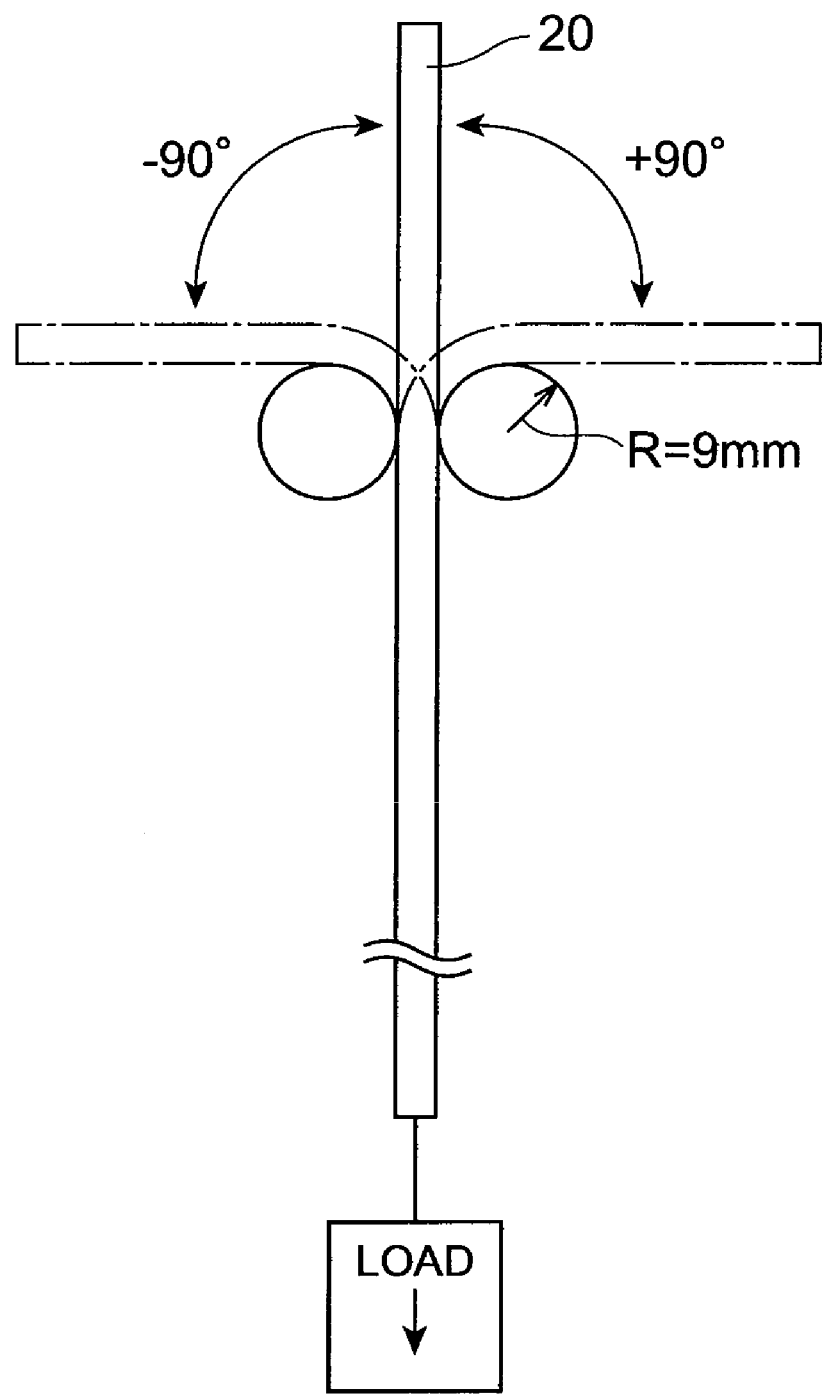
FIG. 12 is a diagram for explaining a method for testing bending performance as durability performance of an optical cable.

Here, to "withstand the predetermined bending test" means that when, as shown in FIG. 12, after bending 100,000 times to 90° to the left and right at a curvature radius of 9 mm is performed, the rupture strength of the optical cable is 50 N or more. When the thickness of the FRP rod-like wire is 2 t and the bending radius is R, a distortion of $t/(R+t)$ occurs at an outermost (innermost) side of the FRP rod-like wire, and the "thickness that withstands the predetermined bending test" refers to a thickness with which this distortion is withstood and a minimum necessary strength is provided. For example, by making the rod-like member have a flat shape with which the thickness in the bending direction is small, the predetermined pulling tension can be secured and the distortion can be lightened. FIG. 12 is a diagram describing the method for testing the bending performance as durability performance of an optical cable.

Basically, by employing high-strength fibers with a rupture elongation of 2% or more in the tension members 17b, rupture due to bending can be prevented with the additional help of the flattening of the high-tension fibers as a whole upon bending of the optical cable 20c. Even when a portion of the high-strength FRP rod-like member at which the distortion is large ruptures partially, not all of the high-strength fibers become ruptured. Although the high-strength fibers are integrated with each other via the matrix resin, the matrix resin has an elasticity modulus that is two orders of magnitude lower than that of the high-strength fibers and breaks easily. Therefore, when a portion of the high-strength fibers ruptures, the matrix resin in the periphery of the ruptured high-strength fibers also breaks and the unruptured high-strength fibers thus do not become ruptured at the same time.

In regard to the bending performance of the optical cable 20c, although the high-strength fibers rupture more readily than in Sample 2-2 of FIG. 10, because the high-strength fibers of high Young's modulus are made integral by the matrix resin, the function of an antishrinking material is also provided. Thus when the optical cable 20c is used under low temperature, low-temperature shrinkage of the thermoplastic resin of high linear expansion coefficient can be resisted and loss increase due to microbending of the coated optical fibers 11 inside the cable jacket 16 can be reduced.

The polyester resin or other thermoplastic resin to be impregnated in the high-strength fibers may be an ultraviolet curing acrylic resin or a thermoplastic resin of low viscosity as long as it is a resin that permeates among the fibers. In regard to the attachment property of the optical connector 9, because the coated optical fibers 11 and the high-strength fibers (tension members 17b) are integrated in close contact with the thermoplastic resin of the cable jacket 16, fixing can be achieved and attachment can be performed readily by simply making the cable jacket 16 be held by the holding portion of the optical connector 9.

Comparative Example 2-1

A structure of a first comparative example (Comparative Example 2-1) of the optical cable 20 according to the second embodiment will now be explained. An optical cable of Comparative Example 2-1 has the cross-sectional structure shown in the area (a) of FIG. 14.

The optical cable of Comparative Example 2-1 is obtained by arranging two of the coated optical fibers 2 in a column as in Sample 2-1 of FIG. 9, positioning the steel wires of 0.4 mm outer diameter as the tension members 3 at opposite sides of the coated optical fibers 2, and integrally covering the coated optical fibers 2 and the tension members 3 with the cable jacket 4 of 2 mm×3 mm. The same multimode glass fiber as that of Samples 2-1 to 2-3 with a core diameter of 50 μm and a cladding diameter of 125 μm is applied as the glass fiber of each coated optical fiber 2. On the outer periphery of the glass fiber, a coating layer, comprised of an ultraviolet curing acrylate resin, is formed to an outer diameter of 250 μm from the surface of the glass fiber. The cable jacket 4 is formed by solid extrusion molding of a soft polyolefin resin of 100 MPa.

The steel wire of the tension member 3 has a Young's modulus greater than that of PBO fiber, and an elongation rigidity (ES product) of the steel wire is 53 kN and more than one order of magnitude greater than the elongation rigidity of 1.7 kN of the fiber glass portion. In the case of the steel wire, the allowable elongation of the steel wire itself becomes the constraint and the allowable elongation of the optical cable is limited to 0.3%. When calculated with the allowable elongation of 0.3%, the allowable tension of the optical cable becomes approximately 160 N and the generally allowable tension of 70 N for optical cables used indoors, etc., can be exceeded. In the case of the steel wire, because the allowable elongation of the steel wire itself is limited to 0.3%, there is no meaning to applying a high-strength coated optical fiber with a screening level, for example, of 1.5%. In regard to the bending property of the optical cable, as mentioned in the "Object(s)" section, the steel wire is low in bending performance due to undergoing metal fatigue and when the cable was bent at a bending radius R of 9 mm, the steel wire portion underwent metal fatigue and became broken at approximately 2,000 times of bending.

Comparative Example 2-2

Figure 14:
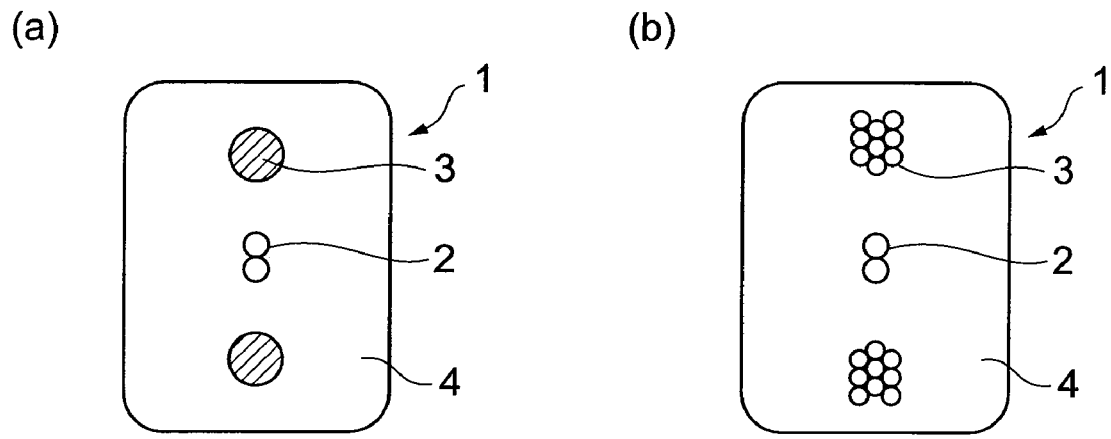
FIG. 14 shows diagrams of cross-sectional structures of conventional optical cables.

A structure of a second comparative example (Comparative Example 2-2) of the optical cable 20 according to the second embodiment has the cross-sectional structure shown in the area (b) of FIG. 14.

The optical cable of Comparative Example 2-2 is obtained by arranging two of the coated optical fibers 2 in a column as in Sample 2-1 of FIG. 9, positioning the stranded wires, each formed by stranding nine steel wires of 0.17 mm outer diameter, as the tension members 3 at opposite sides of the coated optical fibers 2, and integrally covering the coated optical fibers 2 and the tension members 3 with the cable jacket 4 of 2 mm×3 mm. Similar to Samples 2-1 to 2-3, the multimode glass fiber with a core diameter of 50 μm and a cladding diameter of 125 μm is applied as the glass fiber of each coated optical fiber 2. On the outer periphery of the glass fiber, a coating layer, comprised of an ultraviolet curing acrylate resin, is formed to an outer diameter of 250 μm from the surface of the glass fiber. The cable jacket 4 is formed by solid extrusion molding of a soft (Young's modulus: 100 MPa) polyolefin resin.

An elongation rigidity (ES product) of the stranded wire of the tension member 3 is 86 kN, and the allowable elongation of the stranded wire itself becomes the constraint and the allowable elongation of the optical cable is limited to 0.3% in the case of the stranded wire as well. When calculated with the allowable elongation of 0.3%, the allowable tension of the optical cable becomes approximately 260 N and the generally allowable tension of 70 N for optical cables used indoors, etc., can be exceeded. In regard to the bending property of the optical cable, similar to Comparative Example 2-1, metal fatigue cannot be avoided even if thin wires, each of 0.17 mm outer diameter, are used. Thus in the case of the bending radius R of 9 mm, although the number of times of bending until breakage increased in comparison to Comparative Example 2-1, breakage nevertheless occurred at approximately 10,000 times of bending.

FIG. 13 is a table of results of judging bending performance as durability performance of Sample 2-1 to Sample 2-3, Comparative Example 2-1, and Comparative Example 2-2 of the optical cable 20 according to the second embodiment.

FIG. 13 shows the cable tensions when the respective optical cables of Sample 2-1 to Sample 2-3, Comparative Example 2-1, and Comparative Example 2-2 with the above-described structures are bent 100,000 times to 90° to the left and right at the bending radius R of 9 mm (see FIG. 12). In regard to each of Samples 2-1 to 2-3, from the standpoint of optical fiber life, the allowable elongation of the fiber is the constraint and the cable tension at 10% elongation is indicated. For Comparative Example 2-1 and Comparative Example 2-2, the allowable elongation of the steel wire is the constraint and thus the cable tension at 0.3% elongation is indicated.

As can be understood from the results shown in FIG. 13, in each of Samples 2-1 to 2-3, although the cable tension after the bending test decreases slightly from that before the bending test, the pulling tension of 50 N of normally assumable indoor work or the generally allowable tension 70 N is still exceeded. On the other hand, the optical cables of both Comparative Example 2-1 and Comparative Example 2-2 became broken during the bending test.

From the invention thus described, it will be obvious that the embodiments of the invention may be varied in many ways. Such variations are not to be regarded as a departure from the spirit of the invention, and all such modifications as would be obvious to one skilled in the art are intended for inclusion within the scope of the following claims.

Industrial Applicability

The optical cable according to the present invention is applicable to optical wiring that optically connects between a plurality of information equipments installed indoors or inside a vehicle.

The invention claimed is:
1. An optical cable comprising:
a coated optical fiber having a bared fiber mainly comprised of silica glass, and a coating layer provided on an outer periphery of said bared fiber and comprised of an ultraviolet curing resin, said coating layer including;
a first coating with a Young's modulus of 200 MPa or more;
a second coating provided between said bared fiber and said first coating, said second coating having a Young's modulus of 0.5 to 2 MPa;
a colored layer provided on the outer periphery of said coated optical fiber, said colored layer having a rupture elongation of 10% or more; and
a protective layer provided on an outer periphery of said colored layer, said protective layer being comprised of an ultraviolet curing resin with a Young's modulus of 50 to 300 MPa; and
a cable jacket provided on an outer periphery of said coated optical fiber and having a minimum thickness of 0.7 mm or more, said cable jacket, which is comprised of a non-halogen-containing thermoplastic resin, having a

Young's modulus equal to or greater than that of said first coating, the Young's modulus being 500 MPa or more but 1500 MPa or less.

2. An optical cable according to claim 1, wherein said optical cable does not include a tension member.

3. An optical cable according to claim 1, further comprising a connection part attached to said cable jacket so as to be positioned at an end of said optical cable,
wherein said cable jacket is made integral with said coated optical fiber such that an overall pulling tension of said optical cable is 50 N or more when said optical cable is elongated by 1% along its longitudinal direction.

4. An optical cable according to claim 1, further comprising a high-strength fiber bundle being covered integrally along with said coated optical fiber by said cable jacket, said high-strength fiber bundle being covered by said cable jacket at a density such that a force of extracting said high-strength fiber bundle from said cable jacket is 50 N/cm to 900 N/cm.

5. An optical cable according to claim 1, wherein said cable jacket is made integral with said coated optical fiber such that after bending said optical cable 100,000 times to 90° to the left and right at a curvature radius of 9 mm, the overall pulling tension of said optical cable is 50 N or more when said optical cable is elongated by 1% along its longitudinal direction.

6. An optical cable according to claim 1, further comprising a high-strength fiber bundle being covered integrally along with said coated optical fiber by said cable jacket, said high-strength fiber bundle having a conducting property.

* * * * *